(12) United States Patent
Goodwin et al.

(10) Patent No.: US 11,340,951 B2
(45) Date of Patent: May 24, 2022

(54) ESTIMATING AN AMOUNT OF RESOURCES THAT A PROGRAM IS EXPECTED TO CONSUME IN A DATA CENTER

(71) Applicant: Microsoft Technology Licensing, LLC, Redmond, WA (US)

(72) Inventors: Robert Lovejoy Goodwin, Mercer Island, WA (US); Pedram Faghihi Rezaei, Seattle, WA (US); Dragos Barac, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 322 days.

(21) Appl. No.: 16/661,995

(22) Filed: Oct. 23, 2019

(65) Prior Publication Data

US 2021/0124613 A1    Apr. 29, 2021

(51) Int. Cl.
| G06F 9/46 | (2006.01) |
| G06F 9/50 | (2006.01) |
| G06F 8/71 | (2018.01) |
| G06F 9/445 | (2018.01) |
| G06F 8/75 | (2018.01) |

(52) U.S. Cl.
CPC ............... *G06F 9/505* (2013.01); *G06F 8/71* (2013.01); *G06F 9/44505* (2013.01); *G06F 8/75* (2013.01); *G06F 2209/5019* (2013.01)

(58) Field of Classification Search
None
See application file for complete search history.

(56) References Cited

U.S. PATENT DOCUMENTS

| 2009/0031066 | A1 | 1/2009 | Bansal et al. |
| 2012/0246324 | A1* | 9/2012 | Kan ..................... G06F 11/3433 709/226 |
| 2016/0048413 | A1 | 2/2016 | Matsuyama et al. |
| 2020/0026577 | A1* | 1/2020 | Dias ........................... G06F 8/75 |
| 2020/0311600 | A1* | 10/2020 | Kulkarni .................. G06N 3/08 |

OTHER PUBLICATIONS

Invitation to Pay Additional Fees in PCT/US2020/055866, dated Feb. 12, 2021, 14 pages.
PCT Search Report and Written Opinion in PCT/US2020/055866, dated Apr. 6, 2021, 20 pages.
U.S. Appl. No. 16/540,896, Goodwin, et al., filed Aug. 14, 2019, "Orchestration and Scheduling of Services," 58 pages.

* cited by examiner

*Primary Examiner* — Bing Zhao

(57) ABSTRACT

A technique is described herein that intelligently deploys resources in a data center for a new program. The new program has, at least in part, unknown runtime characteristics. The technique involves collecting plural input factors that provide evidence of an expected runtime behavior of the new program. It does so by identifying at least one related program that differs from the new program, but has a specified degree of relatedness to the new program. The collecting operation then obtains information that describes an amount of resources that the related program(s) consume when run. Based on at least some of the plural input factors, the technique generates an estimated amount of resources that the new program is expected to consume when it is run. The technique then determines and deploys a configuration of resources in the data center that will provide the estimated amount of resources.

20 Claims, 13 Drawing Sheets

SUBMITTED PROGRAM $P_S$ FOR DEPLOYMENT BY ENTITY A
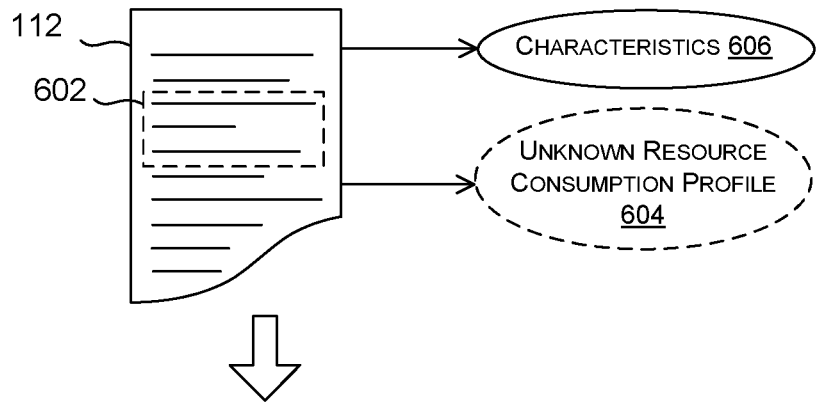
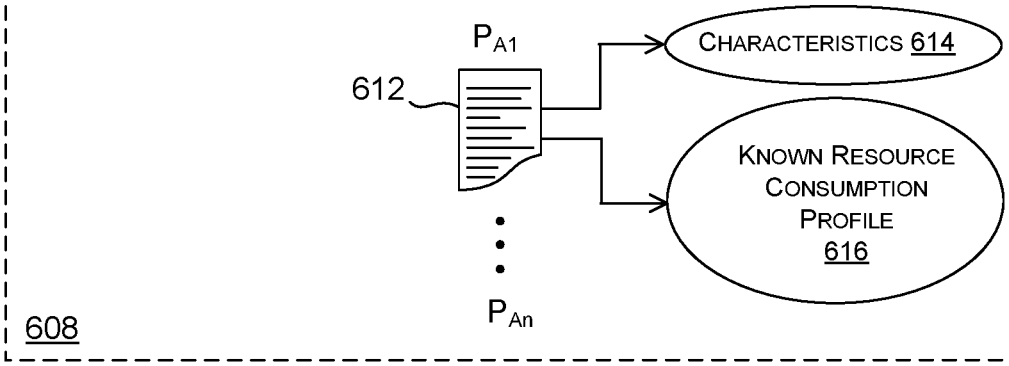
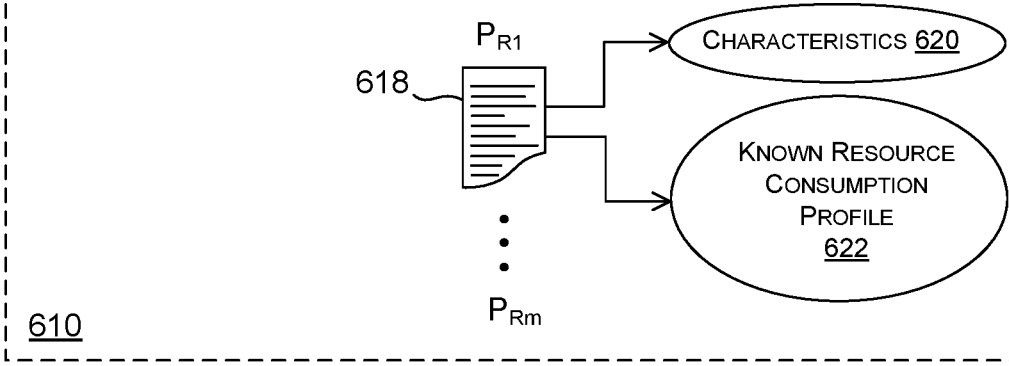
FIG. 6

OVERVIEW OF OPERATION OF THE CSM SYSTEM
1502

RECEIVE A NEW PROGRAM AT A DATA CENTER, THERE BEING INSUFFICIENT INFORMATION DESCRIBING RUNTIME CHARACTERISTICS OF THE NEW PROGRAM, WITH RESPECT TO A PRESCRIBED STANDARD OF SUFFICIENCY.
1504

COLLECT PLURAL INPUT FACTORS THAT PROVIDE EVIDENCE OF AN EXPECTED RUNTIME BEHAVIOR OF THE NEW PROGRAM WHEN THE NEW PROGRAM RUNS IN THE DATA CENTER, INCLUDING EVIDENCE EXTRACTED FROM ONE OR MORE RELATED PROGRAMS.
1506

GENERATE, BASED ON AT LEAST SOME OF THE PLURAL INPUT FACTORS, AN ESTIMATED AMOUNT OF RESOURCES THAT THE NEW PROGRAM IS EXPECTED TO CONSUME WHEN THE NEW PROGRAM IS RUN IN THE DATA CENTER.
1508

OPTIONALLY WEIGHT THE ESTIMATED AMOUNT, RELATIVE OTHER MORE DIRECT EVIDENCE REGARDING THE RUNTIME CHARACTERISTICS OF THE NEW PROGRAM.
1510

IN AN ORCHESTRATING OPERATION, DETERMINE A CONFIGURATION OF RESOURCES IN THE DATA CENTER THAT WILL PROVIDE THE ESTIMATED AMOUNT OF RESOURCES, AND DEPLOY THAT CONFIGURATION OF RESOURCES IN THE DATA CENTER. THE NEW PROGRAM SUBSEQUENTLY RUNS IN THE DATA CENTER USING THE CONFIGURATION OF RESOURCES THAT HAS BEEN DEPLOYED.
1512

FIG. 15

OVERVIEW OF THE COLLECTION OPERATION (BLOCK 1506 OF FIG. 15)
1602

(OPTIONALLY) OBTAIN AT LEAST ONE FIRST INPUT FACTOR THAT DESCRIBES THE RUNTIME CHARACTERISTICS OF THE NEW PROGRAM, IN RESPONSE TO RUNNING THE NEW PROGRAM IN THE DATA CENTER.
1604

(OPTIONALLY) OBTAIN AT LEAST ONE SECOND INPUT FACTOR THAT DESCRIBES A PREDICTED AMOUNT OF RESOURCES THAT IS EXPECTED TO BE CONSUMED BY THE NEW PROGRAM, AS ASSESSED BY A PROVIDER OF THE NEW PROGRAM, AND AS EXPRESSED IN A HINT.
1606

IDENTIFY AT LEAST ONE RELATED PROGRAM THAT HAS DIFFERENT LOGIC THAN THE NEW PROGRAM, BUT HAS A SPECIFIED DEGREE OF RELATEDNESS TO THE NEW PROGRAM.
1608

OBTAIN AT LEAST ONE THIRD INPUT FACTOR THAT DESCRIBES AN AMOUNT OF RESOURCES THAT THE AT LEAST ONE RELATED PROGRAM IS KNOWN TO HAVE CONSUMED WHEN THE RELATED PROGRAM HAS RUN.
1610

FIG. 16

ESTIMATING AN AMOUNT OF RESOURCES THAT A PROGRAM IS EXPECTED TO CONSUME IN A DATA CENTER

BACKGROUND

A cold start scenario arises when a developer or other responsible individual deploys a new program to a data center or other type of computing environment. As used herein, the term "new program" encompasses any program code that is new in its entirety, as well as any program code that represents a modification to a preexisting program. A new program can also have any scope. For instance, a new program may correspond to application code created by a team of developers, or code that defines a service that performs a function within an existing application, etc. Likewise, in those cases in which the new program represents a modification to a preexisting body of code, that modification can have any size (e.g., as measured by a number of new or modified lines of code).

A developer can deploy a new program to a data center by explicitly allocating resources of the data center to the new program, e.g., based on an ad hoc estimation of the amount of resources that the new program will require. This approach is prone to error. Error arises when the developer allocates too few or too much resources to the new program.

SUMMARY

A technique is described herein that allocates and deploys resources in a data center for a new program. The new program has, at least in part, unknown runtime characteristics. The technique involves collecting plural input factors that provide evidence of an expected runtime behavior of the new program. It does so by identifying at least one related program that differs from the new program, but has a specified degree of relatedness to the new program. The collecting operation then obtains information that describes an amount of resources that the related program(s) consume when run. Based on at least some of the plural input factors, the technique generates an estimated amount of resources that the new program is expected to consume when it is run. In an orchestration operation, the technique then determines and deploys a configuration of resources in the data center that will provide the estimated amount of resources.

According to one illustrative feature, the technique can successively expand the universe of related programs from which it draws evidence, until sufficient information is obtained regarding the expected behavior of the new program.

According to another illustrative feature, the technique can also collect direct evidence regarding the behavior of the new program in the data center, if available. This evidence may take the form of guidance (hints) provided by a program developer, and/or information extracted from execution logs provided by the data center. The orchestration operation can perform its task based on a combination of all such evidence, appropriately weighting each piece of evidence based on a level of confidence associated therewith.

According to one advantage, the technique allows a user to proactively address the resource needs of a new program. This provision reduces the risk that a new program will perform poorly when launched, and/or that the new program will negatively affect the performance of other programs hosted by the data center. The technique also avoids an unduly-cautious allocation of resources, and therefore reduces the expense and inefficiency associated with these types of deployments.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 is a diagram that shows how a new program may be considered related to one or more other programs.

FIG. 15 is a flowchart that shows one illustrative manner of operation of CSM system of FIG. 1.

FIG. 16 is a flowchart that shows an illustrative evidence-collecting operation, which is one operation in the process of FIG. 15.

Figure 1:
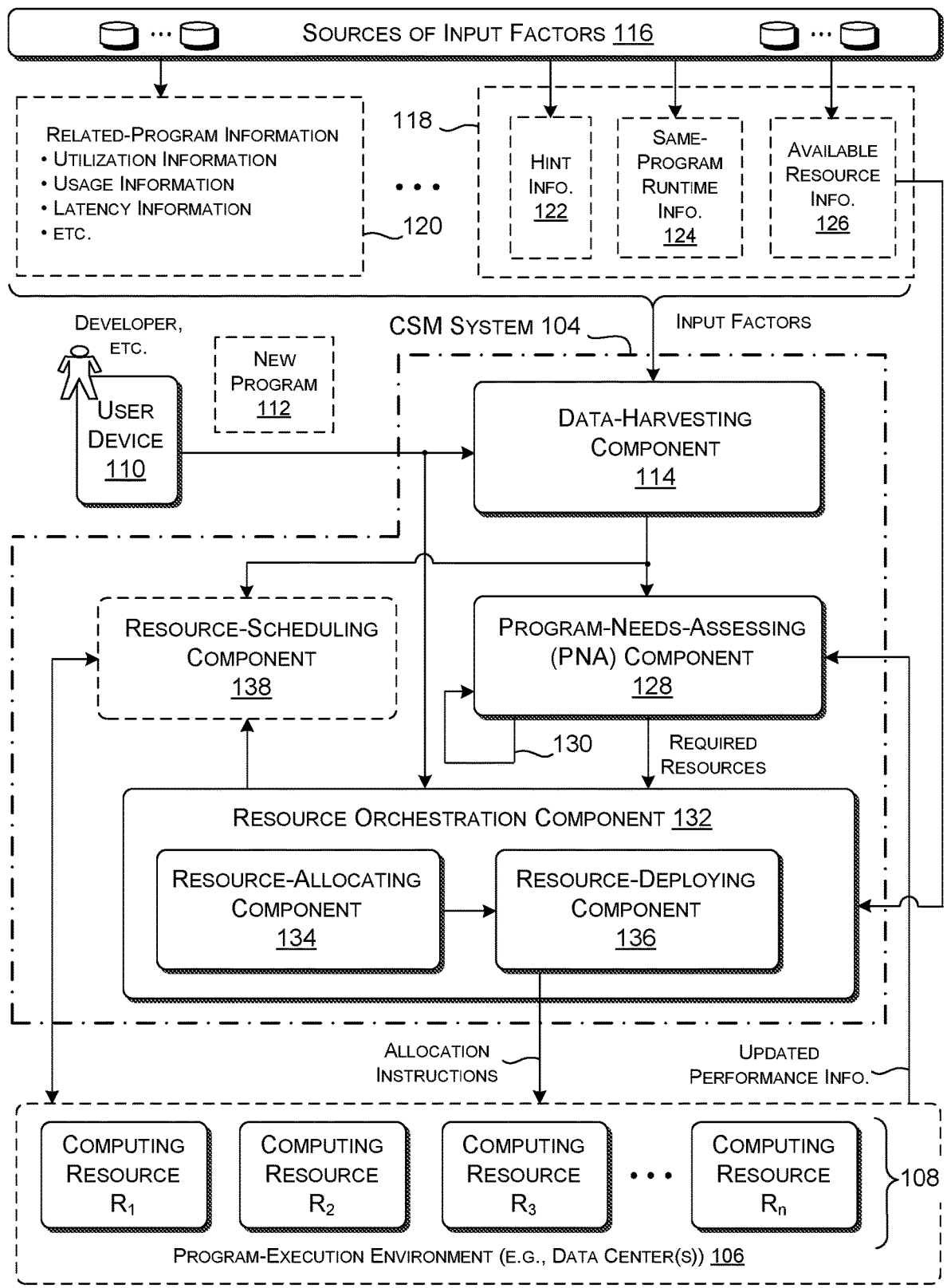
FIG. 1 shows an illustrative computing environment that includes a cold-start-managing (CSM) system. The CSM system manages the allocation of resources for a new program to be deployed in a data center.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a cold-start-managing (CSM) system for deploying new programs in a data center. Section B sets forth illustrative methods that explain the operation of the CSM system of Section A. And Section C describes illustrative computing functionality that can be used to implement any aspect of the features described in Sections A and B.

As a preliminary matter, in certain contexts, a "component," "module," "engine," or "tool" refers to a unit of hardware-implemented logic configured to perform specified operation(s) using any hardware resource(s). The hardware resources may include, but are not limited to, one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. More generally, the term "hardware logic circuitry" refers to hardware-implemented logic that encompasses one or more functional units (e.g., one or more components). Section C provides additional information regarding one implementation of the hardware logic circuitry.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuity of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and non-transitory computer-readable medium are meant to expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Unless otherwise noted, the descriptors "first," "second," "third," etc. are used to distinguish among different items, and do not imply an ordering among items. Finally, the terms "exemplary" or "illustrative" refer to one implementation among potentially many implementations.

A. Illustrative Computing Environment

A.1. Overview

FIG. 1 shows an illustrative computing environment 102 that includes a cold-start-managing (CSM) system 104. The CSM system 104 manages the allocation of resources for a new program to be deployed in a program-execution environment 106. In most of the examples described herein, the program-execution environment 106 corresponds to one or more data centers. Generally, the program-execution environment 106 includes a collection of physical data center resources 108, such as servers, network equipment (e.g., communication conduits, routers, etc.), data stores, etc. For brevity, but without limitation, the program-execution environment 106 is referred below to as a data center, in the singular.

As used herein, the term "new program" encompasses program code that performs any function(s), and can be expressed in any computer language(s), and can have any size. In some cases, for example, a new program represents an entirely new application having any scope. In other cases, a new program represents a modification to a preexisting program. In that context, a new program can include changes having any extent, e.g., as measured by a number of lines that have been changed in the new program, relative to a preexisting counterpart program. One such new program can provide only a single-line change to a preexisting program; another new program can add a new software subcomponent to the preexisting program, and so on.

In still other cases, a new program may be considered new in view of one or more changes made to the context in which the program is implemented, without or without changes to the program code itself. These changes reflect a modification to the resources used by the data center 106. For instance, these changes may reflect the introduction of a new type of server to the data center 106. These changes can also include expanding access to a preexisting program to a new population of users (who did not previously have access to the program). The developer may lack knowledge regarding of the traffic patterns that will arise upon providing the preexisting program to this new class of users.

A cloud computing environment may concurrently host plural instantiations of an application's software code and related data. The cloud computing environment can run these instantiations in parallel. To simplify explanation, the principles set forth below will be mostly set forth in the context of a single instantiation of an application's software code. More broadly, however, the term "running application" is meant to encompass either a single instantiation of an application's software code (and related data) that runs on the hardware resources 108 of the data center 106 or plural instantiations of the application's software code (and related data). Any single instance of a running application, in turn, is made up of one or one or processes. That is, the term "process" refers to at least part of an instance of a running application that is implemented by a particular computing resource (e.g., a particular server) of the data center 106. Subsection A.4 (below) describes how the CSM system 104 allocates resources 108 in the data center 106 to processes.

A "program module" corresponds to any component that performs a particular set of tasks in a running application. In one non-limiting implementation, a program module may correspond to a service. That service, in turn, may reflect a runtime instantiation of a dynamic linked library (DLL). In this context, the new program that is received can correspond to an updated DLL, or entirely new application that is composed of two or more DLLs (and, indeed, perhaps hundreds, thousands, etc. of DLLs). At load time, a runtime environment dynamically links program modules together to produce one or more processes.

Generally stated, a new program may be considered "new" in the sense that the data center 106 lacks sufficient evidence as to the runtime characteristics of the program, from which its resource needs may be gauged. This applies to the case in which the data center 106 has never deployed the new program; here, the execution logs of the data center 106 will contain no evidence as to the runtime performance of the new program. But this is also true to varying extents with respect to a program that has only recently launched, and/or a program that is infrequently used. Each environment can establish criteria that identifies what constitutes a sufficient amount of evidence in the execution logs of the data center 106. For example, an environment can gauge the sufficiently of the evidence based on the amount of time that has elapsed since the launch of the application, the number of transactions that the application has completed, the statistical level of confidence exhibited by information in the execution logs, and so on. In general, a cold start scenario corresponds to the act of introducing a new program to a data center 106 without sufficient evidence of how it will perform.

Cold start scenarios pose technical challenges. Due to the absence or deficiency of execution logs for the new program, a developer may lack a good understanding of the amount of resources that the data center 106 will consume in running the new program. As a result, there is a risk that a developer may underestimate or overestimate the demands that the new program will make on the data center 106. Indeed in some cases, the developer may purposely overestimate the amount of needed resources to compensate for his or her acknowledged lack of insight into the requirements of the new program, and/or his or her anticipated inability to make timely adjustments to the allocated resources should contention issues arise.

The data center 106 may fail to meet desired performance goals when the new program lacks sufficient resources to perform its assigned tasks. In more concrete terms, as a result of misjudging the resource requirements, a new program may run slower than desired, or may fail in its entirety. The new program may also negatively impact the ability of the data center 106 to meet the service level agreements associated with other programs that it hosts. This is caused by the contention among programs for the use of the limited resources provided by the data center 106, having the effect of starving one or more programs of the resources that they need to meet desired performance goals. On the other hand, by overestimating the demands of the new program, the developer wastes the resources of the data center 106.

The CSM system 104 described below is devoted to the task of intelligently managing the cold start scenario. The CSM system 104 specifically aims to maintain satisfactory levels of performance in the data center 106 upon introducing the new program, without a wasteful over-allocation of resources.

Now turning to the illustrative computing environment 102 of FIG. 1 in greater detail, assume that a developer or other individual uses a user computing device 110 to submit a new program 112 to the CSM system 104. A data-harvesting component 114 begins analysis on the new program 112 by collecting plural input factors from one or more sources 116. Each input factor corresponds to input information that expresses evidence of an expected behavior of the new program 112 when it runs in the data center 106. That evidence falls into at least two general categories. A first category corresponds to same-program information 118 that describes the runtime characteristics of the new program 112 itself (if available). That is, this information is characterized as "same-program" because it relates to the new program 112 itself, which corresponds to the target program for which analysis is being performed. A second category corresponds to related-program information 120 that describes the runtime characteristics of one or more programs that are related to the new program 112. These programs are referred to as "related programs" because they are related to the new program 112, but are not the same as the new program 112. Section A.2 below will provide additional detail illustrative techniques by which the data-harvesting component 114 can assess the degree of relatedness between two programs. In general, the CSM system 104 leverages the information regarding the related programs as a proxy for the unknown behavior of the new program 112 itself.

More specifically, the first category of same-program information 118 includes hint information 122 explicitly added by a developer or other individual that describes the expected runtime characteristics of the new program 112. For instance, the hint information 122 can convey the amount of data center resources of different kinds that the new program 112 is expected to consume when run, and/or the amount of time that different operations of the new program 112 are expected to take to run, and so on. The developer can add the hints to the new program 112 itself, e.g., in the form of metadata, comments embedded in code, method attributes, etc. In addition, or alternatively, the developer can express his or her hints via some other file(s) that accompany the new program 112. The data-harvesting component 114 can extract the hint information 122 from whatever source items contain this information, e.g., by examining the source code associated with the new program 112 for a telltale attribute or field that identifies hint information.

The first category of information 118 also includes same-program runtime information 124 (if available) that expresses the actual runtime characteristics of the new program 112, if any (presuming, of course, that the data center 106 has actually executed the new program 112). The runtime information 124 has various dimensions, such as utilization information, load information, latency information, runtime dependency information, etc. The utilization information expresses the traffic experienced by the new program 112 over a specified span of time. The load information expresses the amount of resources of different kinds that the new program 112 has consumed over a span of time. The latency information describes the amount of time that the new program 112 has taken to perform its various functions. The runtime dependency information expresses the manner in which program modules (e.g., corresponding to instantiations of DLLs) are dynamically linked together during the execution of the new program 112, and so on.

The above-described types of information can be expressed across various dimensions. For instance, the load information can be expressed for different types of resources consumed in running the new program 112 (e.g., processor resources, memory resources, cache resources, network resources, etc.). The above-described information can also be expressed in any level of granularity. For instance, the load information can express the amount of resources consumed by the new program 112 in performing a transaction, and/or the aggregate amount of resources consumed by the new program 112 over a specified span of time. In addition, or alternatively, the load information can express the amount of resources that the new program 112 consumes as a whole, or the amount it consumes in executing a particular instruction, subroutine, etc.

The above-described types of information can also be expressed using any combination of metrics. For instance, the utilization information can be expressed by specifying a maximum number of transactions handled by the new program 112 within a span of time, the minimum number of transactions, the average number of transactions, etc. In the concrete case of a search engine, the utilization information can be expressed as the number of queries-per-second (QPS) processed by the search engine.

The above kinds of same-program runtime information 124 are set forth in the spirit of illustration, not limitation; other implementations can collect yet other types of information that characterizes the runtime behavior of the new program 112. The data-harvesting component 114 can receive this information 124 from one or more execution logs maintained by the data center 106. A performance-monitoring component (not shown in FIG. 1), in turn, supplies this information 124 in response to monitoring the real-time behavior of the new program 112 in the data center 106. To repeat, however, note that, in many cases, the data center 106 may entirely omit runtime information 124 for the new program 112. In other cases, the data center 106 provides some runtime information 124, but this information is not yet statistically robust (e.g., because the new program 112 has just launched and/or is infrequently used).

The same-program information 118 can also include information 126 that describes a set of constraints imposed by the data center 106. For instance, this information 126 can include information that reveals the number of servers currently deployed in the data center 106, the hardware features of each server (e.g., the number of threads supported by each computer processing unit), the amount of storage resources in the data center 106, the capacity of network resources provided in the data center 106, and so on. The information 126 can also include administrative settings that describe the amount of resources that the new program 112 is permitted to use, which may correspond to some fraction of the total amount of resources offered by the data center 106. The remainder of the resources is treated as reserve capacity. Note that this kind of information 126 does not pertain to the runtime characteristics of the new program 112 per se, although it has an indirect bearing on those runtime characteristics. The data-harvesting component 114 can receive the available resource information 126 from one or more data stores that provide configuration information relevant to the operation of the data center 106.

The second category of related-program information 120 includes any fields of information described above for the same-program information 118, but expressed in the context of the runtime behavior of a program other than the new program 112. For example, the related-program information can include at least: utilization information, load information, latency information, etc. The utilization information expresses the traffic experienced by a related program over a specified span of time. The load information expresses the amount of resources of different kinds that a related program has consumed over a span of time on a per-transaction basis and/or any other basis. The latency information describes the amount of time that a related program has taken to perform its various functions, and so on.

The above-described related-program information may characterize the steady-state behavior of a related program. In addition, if available, the related-program information 120 can express cold start information that specifically describes the runtime behavior of the related program over a span of time after it initially came online. For example, the cold-state information can convey the amount of resources (for different types of resources) that the related program consumed during the first 48 hours after coming online; it can do this on a per-transaction basis and/or any other basis. This information is valuable because a related program may exhibit certain undesirable behavior when it is first introduced, which a systems engineer quickly works to remedy. Insofar as the new program 112 is closely related to another program, it may exhibit the same undesirable behavior at startup.

The data-harvesting component 114 can collect yet other input factors pertaining to the static properties of the new program 112 itself. This information has a bearing on the runtime behavior of the new program 112, but is not based on observations of actual runtime behavior of the new program 112. For example, the data-harvesting component 114 can perform static analysis on the new program 112 to identify the size of the new program 112, e.g., as measured by the number of lines that have been added and/or changed with respect to a previous version of the new program 112, if any. In some cases, a large program change poses greater uncertainty than a small program change, with respect to the estimated resource consumption of the new program 112. The data-harvesting component 114 can also use known static analysis techniques to identify the configure-time dependencies among program modules within the new program 112. For instance, this information may describe the links between DLLs in the new program 112. In addition, the data-harvesting component 114 can perform static analysis to classify the types of operations invoked by the new program 112. In addition, or alternatively, the data-harvesting component 114 may perform more targeted static analysis by identifying a subset of operations that are known to pose a high risk of large resource consumption. High-risk operations include various instructions that involve interaction with an external entity via a network, various instructions that involve database operations, and so on. The data-harvesting component 114 can identify these high-risk operations using various techniques. For example, the data-harvesting component 114 can use a lookup table or machine-trained classification network to perform this task.

The data-harvesting component 114 can also collect information regarding the environment(s) in which each related program operates. Again, this does not have a direct bearing on the runtime behavior of the related program. But it does help establish whether the related program is a good proxy for the new program 112. For example, the data-harvesting component 114 can provide input factors that describes the kinds of operations performed by the related program, the entity(ies) that have produced the related program, the kinds of users who interact with the related program, the circumstances in which the users interact with the related program, and so on. Collection of this kind of information presupposes that the data-harvesting component 114 is permitted to do so, e.g., by the appropriate end users, organizations, and regulatory bodies.

The data-harvesting component 114 can collect related-program information 120 from various sources 116, such as data centers that host the related programs. It can also collect metadata and other information from the related programs themselves, and/or from publicly available information regarding the related programs, and so on. In one environment, a data center may run programs provided by different developers and organizations, including the organization associated with the new program 112. This data center therefore provides a central repository of information that an administrator can mine for related-program information, if authorized to do so.

The above-described types of input factors are set forth in the spirit of illustration, not limitation. Other implementations can collect yet other types of input factors, and/or can omit one or more of the types of input factors described above.

A program-needs-assessing (PNA) component 128 uses any combination of the input factors to generate an estimate of the amount of resources that the new program 112 is expected to consume when loaded into the production system of the data center 106. In some implementations, the PNA component 128 specifically generates an upper-bound or worst-case estimate of the amount of resources that the new program 112 will consume in the data center 106, with reference to any environment-specific assumptions that define a universe of possible occurrences. Subsection A.3 below provides a detailed description of various implementations of this component. By way of overview, the PNA component 128 can use different analysis techniques for mapping the above-described input factors into an estimate of the amount of resources that may be consumed. These techniques can use a rules-based engine, a solver component, a machine-trained model, etc., or any combination thereof. The loop 130 indicates that the PNA component 128 can optionally perform its analysis in an iterative manner. In each iteration, the PNA component 128 can expand or otherwise modify the scope of evidence that it uses to generate the estimate. The PNA component 128 can terminate its analysis when it generates an estimate having a requisite degree of confidence, with respect to any environment-specific reference as to what constitutes a sufficient level of confidence.

A resource orchestration component 132 allocates resources in the data center 106 to handle the deployment of the new program 112, and then deploys the new program 112 in the data center 106. In one case, assume that the new program 112 represents a new application having no preexisting counterpart. Here, the resource orchestration component 132 loads one or more processes into the memory of the data center 106, where those process(es) cooperatively provide at least one runtime-instantiation of the new program 112. In another case, assume that the new program 112 represents a new or modified part of an application that is already running in the data center 106. For instance, the new program 112 may represent a new or modified DLL within application code that makes reference to many other DLLs. Here, the resource orchestration component 132 loads a new program module into at least one instantiation of a preexisting running application, where that program module represents a runtime instantiation of the new program 112.

More specifically, a resource-allocating component 134 determines how to assign the process(es) (that instantiate an application including the new program 112) across physical resources of the data center 106. A resource-deploying component 136 performs the actual task of loading the process(es) (or part thereof that needs to be changed) into memory. This process also involves dynamically linking the program modules together. A resource-scheduling component 138 determines the timing at which different program modules are invoked during execution of the process(es). Subsections A.4 and A.5 provide additional details regarding one implementation of the resource-allocating component 134 and the scheduling component 138, respectively.

Note that the CSM system 104 facilitates the task of estimating resources in some cold start scenarios, but not necessarily all cold start scenarios. The CSM system 104 may fail in those situations in which the new program 112 introduces a sudden change in the behavior of a system that is predicted to result in significant resource contention. In addition, or alternatively, the CSM system 104 may fail in those situations in which the new program 112 represents a particularly novel change for which no reliable preexisting proxy programs can be found. In both cases, the CSM system 104 can alert a developer or other responsible individual to its inability to arrive at a statistically-meaningful prediction. If given sufficient forewarning of impending resource contention, a developer may then manually estimate the amount of resources that the new program 112 is likely to consume.

Figure 2:
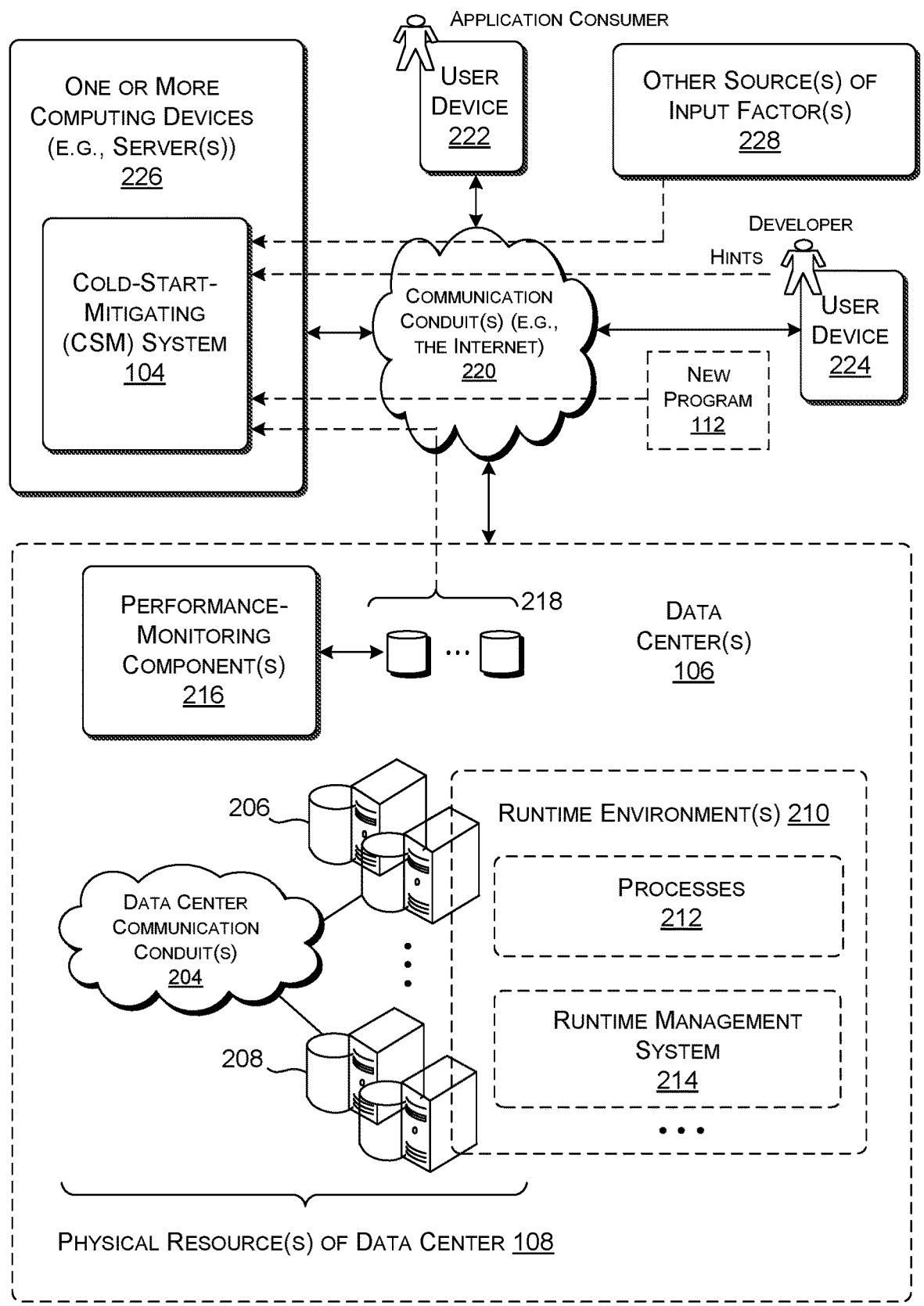
FIG. 2 shows illustrative computing equipment that can be used to implement the CSM system.

FIG. 2 shows illustrative computing equipment 202 for implementing the computing environment 102 of FIG. 1. The computing equipment 202 includes one or more data centers 106 (referred to in the singular below) provided at one or more geographic locations. The data center 106 includes a collection of hardware resources 108, such as servers (and/or other kinds of computing devices), data stores, communication conduits 204, cooling equipment, equipment racks, and so on. The servers and data stores can be organized into plural clusters of computing devices, such as representative cluster 206 and cluster 208. That is, each such cluster includes one or more servers and one or more storage devices. The communication conduit(s) 204 can include a local area network (including routers, etc.), point-to-point data links, etc.

Collectively, the servers host one or more runtime environments 210, referred to in the singular below for simplicity. The runtime environment 210, in turn, can include one or more processes 212 and a runtime management system 214. Each process corresponds to an instantiation of at least part of an application's software code (and associated data) that runs using a particular computing resource (e.g., a particular server) of the data center 106. As mentioned earlier, a "running application" can encompass one or more runtime instances of an application's software code and related data. A process may include one or more program modules. Each program module, in turn, may correspond to a runtime instantiation of a DLL or other kind of software module. The runtime management system 214 manages the processes 212. For example, the runtime management system 214 performs tasks such as deploying processes on the physical resources 108 of the data center 106, as governed by instructions from the resource-allocating component 134. When viewed from a more encompassing perspective, the runtime management system 214 shown in FIG. 2 corresponds to an encompassing runtime management framework that manages processes across the entire data center 106.

One or more performance-monitoring components 216 detect the behavior of a process (or part thereof) as it executes. To perform its monitoring function, the performance-monitoring component(s) 216 can receive signals from each server that describes its current memory capacity, processor-related capacity, storage capacity, etc. It can also receive signals upon the start and end of various processes, from which it detects latencies of various operations performed by a process. It can also feed these types of signals into one or more counters, which provide a measure of a number of transactions (e.g., queries) processed by the process. The performance-monitoring component(s) 216 can store all such information in one or more data stores 218, which provide one or more execution logs.

Other computing devices may interact with the data center 106 via one or more communication conduits 220. The communication conduit(s) 220 may include a wide area network (e.g., the Internet). For instance, an end user (application consumer) may use a user computing device 222 to submit a query to a search engine hosted by the data center 106. In response, the search engine generates and delivers search results to the user, for consumption by the user via the user computing device 222. A developer or other individual may use another user computing device 224 to submit a new program 112 to the CSM system 104, upon which the CSM 104 processes it in the manner described above with reference to FIG. 1. Any user computing device can correspond to any of: a desktop personal computing device, a laptop computing device, any type of handheld computing device (such as a smartphone), a wearable computing device, and so on.

One or more other computing devices 226 (such as one or more servers) implement the CSM system 104, such as one or more servers coupled to the communication conduit(s) 220. These computing device(s) 226 can be considered separate from the data center 106, that is, "outside" the data center 106 that hosts the processes 212. However, any functions attributed herein to the other computing devices 226 can alternatively, or in addition, be performed by the data center 106. For instance, in another implementation, the CSM system 104 is implemented in its entirety by the data center 106. Likewise, any functions attributed to the data center 106 can alternatively, or in addition, be performed by the other computing devices 226. In still other implementations, the entirety of the CSM system 104 can be implemented by one or more local computing devices. In addition, or alternatively, the runtime management system 214 can be implemented by one or more local computing devices. More generally stated, the principles described herein are implemented in the illustrative case of a cloud computing environment, but are not limited to this implementation.

Finally, FIG. 2 shows that the CSM system 104 can interact with various sources 228 of input factors. These sources 228 can correspond, for instance, to computer servers accessible via the Internet.

Figure 3:
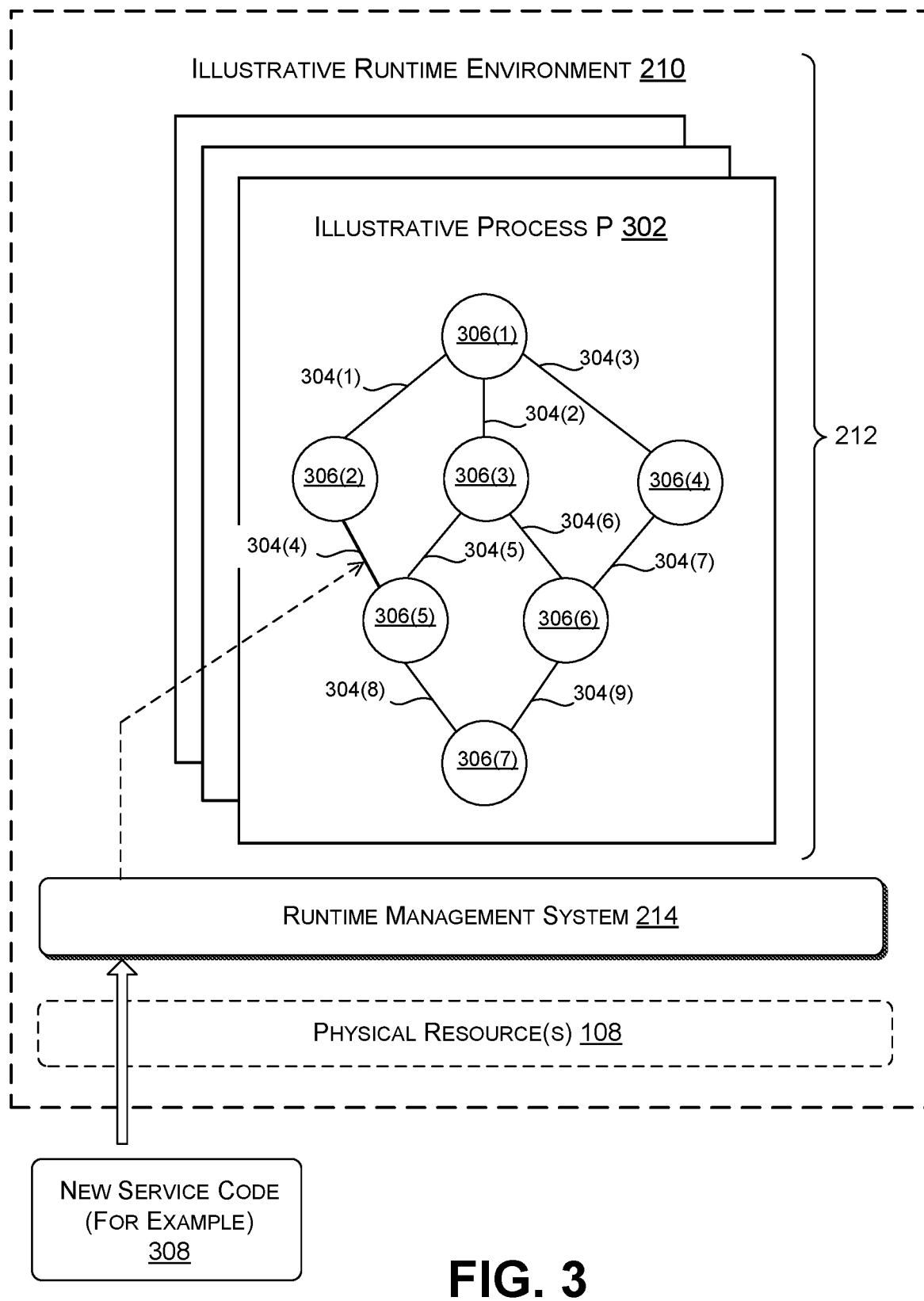
FIG. 3 shows an illustrative runtime environment that can be hosted by the computing equipment of FIG. 2.

FIG. 3 shows illustrative aspects of the runtime environment 210 hosted by the computing equipment 202 of FIG. 2. The runtime environment 210 hosts one or more processes 212, including a representative process P 302. Assume here that the process P 302 represents all of functionality associated with one instance of a corresponding instance of a running application X, although this may not be true in general. The process P 302 operates in memory allocated to it by the runtime management system 214; that memory, in turn, may be provided by a single computing resource of the data center 106, such as a single server.

The runtime environment 210 represents the process P 302 as an acyclic directional graph (DAG). FIG. 3 represents an illustrative DAG as a collection of data nodes (circles) linked together by edges (lines connecting the circles). The circles represent instances of data, while the edges represent program modules (also referred to as services herein) that operate on the instances of data. Generally, information flows from top to bottom in the representative DAG shown in FIG. 3.

More specifically, the process P 302 shown in FIG. 3 includes nine program modules 304(1), 304(2), . . . , 304(9). Note, however, that this is a simplified example; in actual practice, the process P 302 can include hundreds, thousands, etc. of program modules. Each program module maps input data to output data. In some cases, the output data of a program module serves as input data for one or more other "downstream" program modules. FIG. 3 represents seven instances of data, 306(1), 306(2), . . . , 306(7). For instance, a program module 304(4) receives an instance of input data 306(2), and then performs some operation on the input data 306(2) to generate an instance of output data 306(5). A subsequent program module 304(8) consumes the data 306(5) as input data.

The use of a DAG to organize program modules is merely illustrative. Other implementations of the principles described herein can organize program modules using other data structures and strategies.

The runtime management system 214 updates the process P 302 upon the receipt of each instance of new program code. Here, assume that the runtime management system 214 receives an instance of updated program code 308 that is used to instantiate an updated version of the program module 304(4). The runtime management system 214 responds to the receipt of the new program code 112 by creating a new version of the application manifest, and then loading the corresponding updated program module 304(4) into the process P 302. In this operation, the runtime management system 214 need not relink all program modules in the process P 302. Nor need the runtime management system 214 shut down the process P 302 while the upgrade is being performed.

By virtue of the above-described approach, the runtime management system 214 expedites the deployment of an updated process P 302. This is because the approach incrementally makes changes to the system, without requiring reloading (and relinking) the entire set of program modules in the process P 302 after each change. The approach also makes efficient use of the physical resources 108 of the data center 106. This is because the approach dynamically makes changes to a live production system, rather than implementing updates on a dedicated (and separate) deployment system. The approach also offers good user experience. This is because the approach allows a user to continue to work with an application while it is being upgraded (preferably without any noticeable degradation in performance), rather than temporarily disabling the application during a loading process.

Figure 4:
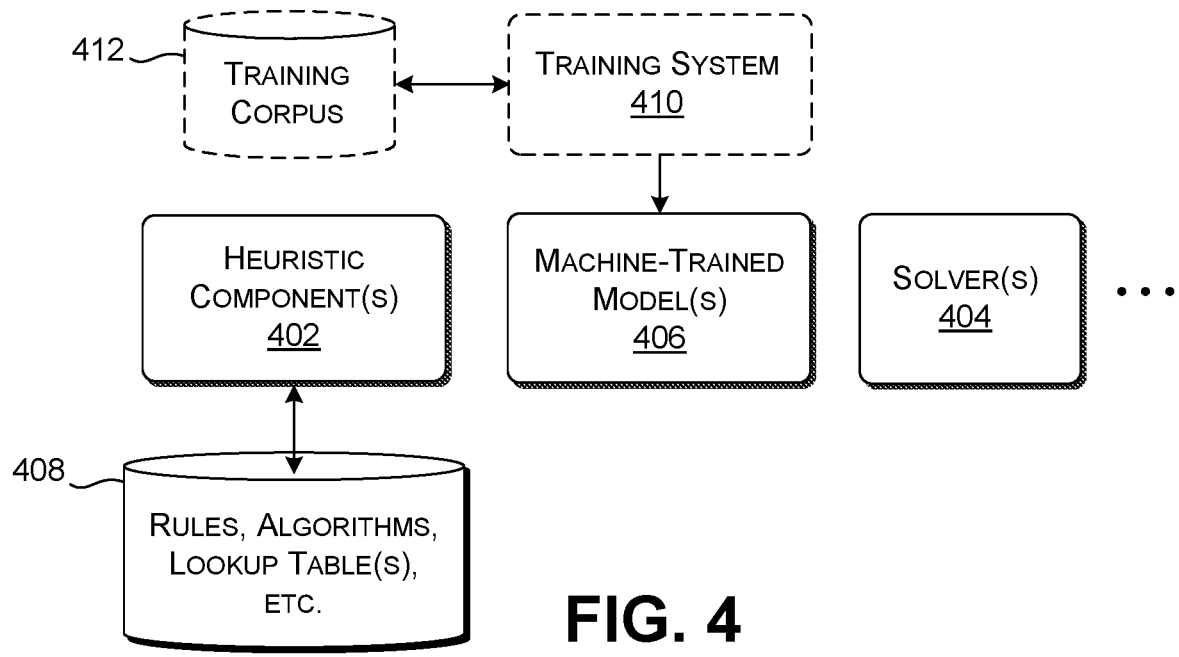
FIG. 4 shows illustrative functionality that the CSM system can use to implement any of its internal components.

FIG. 4 shows illustrative functionality that the CSM system 104 can use to implement any of its internal components. That is, each of the components of the CSM system 104 can use an instance of functionality shown in FIG. 4, or any combination of instances.

As shown in FIG. 4, the CSM system 104 can include one or more heuristic components 402, one or more machine-trained models 404, one or more automated solvers 406, etc. The heuristic component (s) 402 provide analysis based on predetermined rules, and/or algorithms, and/or lookup tables, etc. in a data store 408. Examples of illustrative rules will be provided below. The machine-trained model(s) 406 generate output results based on weighting and bias values generated by an offline training system 410. The training system 410, in turn, operates by iteratively processing training examples in a data store 412 using any optimization technique(s), such as stochastic gradient descent. Examples of illustrative machine-trained models will be provided below. The automated solver(s) 406 generate output results by automatically solving mathematical equations and/or other problems. Automated solvers include various computer-implemented tools for solving linear and nonlinear equations, various computer-implemented tools for performing optimization, various computer-implemented tools for performing constraint-satisfaction-solving tasks, etc.

A.2. Data-Harvesting Component

Figure 5:
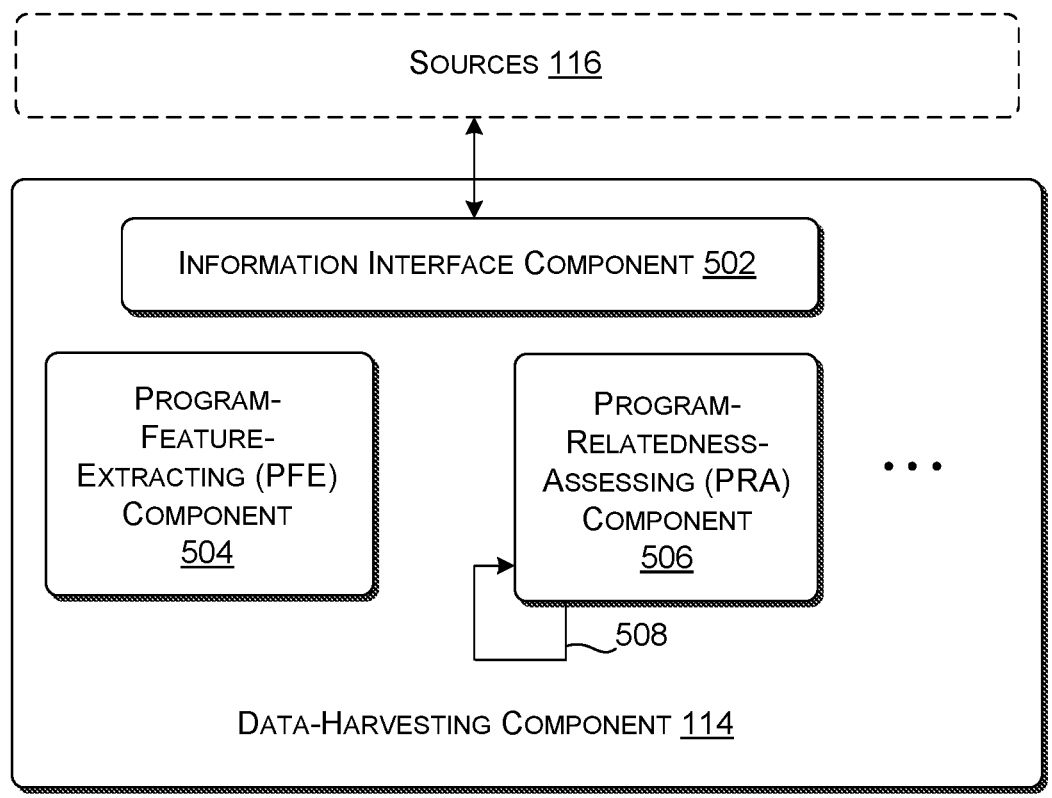
FIG. 5 shows one implementation of a data-harvesting component, which is one element of the CSM system of FIG. 1.

FIG. 5 shows one implementation of the data-harvesting component 114 introduced in the explanation of FIG. 1. Generally, the purpose of the data-harvesting component 114 is to receive input factors that provide evidence as to the expected behavior of a new program 112. Some of this information directly relates to the new program 112 itself, in those cases in which that information is available. Other information pertains to one or more programs that are deemed to be related to the new program 112, but are not the same as the new program 112. These other programs are referred to herein as "related programs."

An information interface component 502 provides an interface for collecting the input factors. The information interface component 502 can collect any type of information using any combination of approaches, such as a pull-based approach (in which the data-harvesting component 114 explicitly requests information from a source), and a push-based approach (in which a source independently forwards information to the data-harvesting component 114).

A program-feature-extracting (PFE) component 504 performs various kinds of static analysis on the new program 112. For example, the PFE component 504 can determine the size of a new program 112 that has no prior counterpart by counting the number of lines in the new program 112. The PFE component 504 can determine the extent of modification to an existing program by comparing the existing program to the previous version of the program, and counting how many lines of code have changed.

In addition, the PFE component 504 can flag those operations (if any) in the new program 112 that may demand elevated resources, with reference to any environment-specific standard as to what constitutes "elevated" in a particular environment. For instance, the PFE component 504 can provide a list that identifies a feature signature each operation that is known to require an elevated amount of resources to run. In operation, the PFE component 504 determines whether a feature signature associated with a program operation under consideration in the new program 112 matches any feature signature in the list. If so, the PFE component 504 can flag that operation as a potentially high-consumption operation. In addition, or alternatively, the PFE component 504 can use a machine-trained classification model to map the feature signature associated with an operation under consideration to an output conclusion as to whether or not that operation is likely to consume an elevated amount of resources to run. The feature signature may correspond to any salient information regarding an operation under consideration, such as its source code. In addition, an operation under consideration may involve interaction with some other unit of program code, potentially implemented by a different server than the server on which the new program 112 will run; in that case, the feature signature can also encompass information regarding the entity with which the operation communicates.

Operations that may pose an elevated consumption of resources include certain operations that require interaction with remote servers via a network connection, certain operations that require interaction with entities that are known to have slow response times (as assessed with respect to any environment-specific information that defines what constitutes a "slow" response time), certain operations that involve database retrieval operations, certain operations that involve performing a high number of iterations (again, with respect to any environment-specific threshold value as to what constitutes "high" in this context), and so on.

The PFE component 504 can perform yet other static analysis. For instance, the PFE component 504 use known static linking analysis to identify the connections among sub-programs in the new program 112. This explanation refers to this information as static-level dependency information. Note that the performance-monitoring component(s) 216 (of FIG. 2) will later record information regarding how a new program's processing modules link together at runtime. That information constitutes runtime-level dependency information. Runtime-level dependency information can vary across different executions of a process, and generally reveals additional insight to the static-level dependency information.

The PFE component 504 can also identify those cases in which a change made to one program module may having a bearing on the sufficiency of information regarding another program module. For example, assume that the new program 112 invokes a function that is implemented in a preexisting program module. The invocation of the function in the preexisting program module serves as a hint that the usage history of that preexisting program module is no longer reliable, or at least less reliable than it was prior to the update. This change therefore impacts the available knowledge regarding the preexisting program module, even though that preexisting program module did not undergo a programmatic change itself.

A program-relatedness-assessing (PRA) component 506 determines whether a program under consideration (referred to below as a candidate program) is deemed sufficiently related to the new program 112. If so, the PRA component 506 identifies this candidate program as a related program. Different environments can identify what constitutes sufficient relatedness based on environment-specific rules, examples of which are described below.

Turning first to FIG. 6, this figure summarizes the problem that the PRA component 506 attempts to solve. Assume that the new program 112 has a preexisting counterpart (not shown), corresponding to a previous version of the new program 112. Further assume that the new program 112 differs from its earlier version by including a new or modified code portion 602, such as a new 1000-line subroutine. Finally assume that the new program 112, in its modified form, has never been executed by the data center 106. Therefore, the execution logs of the data center 106 contain no information regarding the runtime characteristics of this specific version of the program. This means that a resource consumption profile 604 of the new program 112 will be empty. In yet other examples, the current version of the new program 112 may have recently launched, meaning that there is some (although not sufficient) information in the execution logs of the data center 106; here, the resource consumption profile 604 of the new program 112 will be incomplete, rather than entirely empty.

Even though there may not be any runtime information regarding the new program 112, the data-harvesting component 114 can still identify some characteristics 606 of the new program 112 by using the PFE component 504 to perform static analysis on the new program 112. The data-harvesting component 114 can also extract additional characteristics 606 of the new program 112 in the form of metadata pertaining to the new program 112, such as the organization (e.g., company) that intends to run the new program 112, the developer(s) who created the new program 112, the time at which the new program 112 was created, the classification of the new program 112, and so on.

The role of the PRA component 506 is to identify one or more related programs (if any) that serve as reliable proxies of the new program 112. The PNA component 128 (described in Subsection A.3) subsequently uses the runtime behavior of these related program(s) to help determine the expected resource consumption of the new program 112.

In operation, the PRA component 506 can mine runtime information from different tiers of related programs having decreasing relatedness to the new program 112. A first group (not shown) of related programs represents earlier versions (if any) of the new program 112. A second group 608 of related programs corresponds to programs hosted by the same organization (or more generally, entity) that provides the new program 112. The second group itself can be partitioned into a hierarchy of tiers of relevance. A first subgroup in the second group 608 identifies related programs that belong to a same overarching master system as the new program 112, such as a search engine. A second subgroup in the second group 608 identifies related programs that perform the same or related task(s) as the new program 112, or which originate from the same business division as the new program 112, but do not necessarily correspond to parts of a single system. A third subgroup in the second general group 608 corresponds to all other programs provided by the organization (entity).

A third group 610 corresponds to programs provided by organizations (or more generally, entities) other than the organization (entity) with which the new program 112 is associated. This general group 610 can also be broken down into a hierarchy of tiers of relevance. A first subgroup in the third group 610 identifies related programs that perform the same or related task(s) as the new program 112, or which originate from the same business sector as the new program 112. A second subgroup in the third general group 610 corresponds to all other programs provided by the other organizations (entities).

The above-described tiers are presented in the spirit of illustration, not limitation; other implementations can partition a set of candidate programs into any other taxonomies of relatedness. In general, each related program can be said to have a set of characteristics, including information provided by the PFE component 504, metadata associated with the related program, and so on. Each related program also has a known resource consumption profile that describes its known behavior at runtime. For instance, an illustrative related program 612 has a set of characteristics 614 and a known resource consumption profile 616, and an illustrative related program 618 has a set of characteristics 620 and a known resource consumption profile 622.

Returning momentary to FIG. 5, a loop 508 indicates that the PRA component 506 can repeat its analysis for different scopes of program code. For instance, again assume that the new program 112 is new insofar as it adds a new code portion 602 to a previous version of the same program. For instance, that new portion 602 can correspond to a new operation or a new sub-routine, etc. The PRA component 506 can identify what constitutes a related program with respect to the new portion 602, and then what constitutes a related program with respect to the new program 112 as a whole, or vice versa.

The PRA component 506 can also perform targeted relatedness analysis for specific operations that appear in the new program 112. For example, assume that the new program 112 contains an operation that involves interaction with a remote server via a network connection. Further assume that the PFE component 504 flags this operation as likely to consume an elevated amount of resources, relative to any specified environment-specific baseline value. The PRA component 506 can find one or more related programs that contain the same or similar operation, and extracts any information that has a bearing on the amount of resources that this operation consumes in those related programs.

Figure 7:
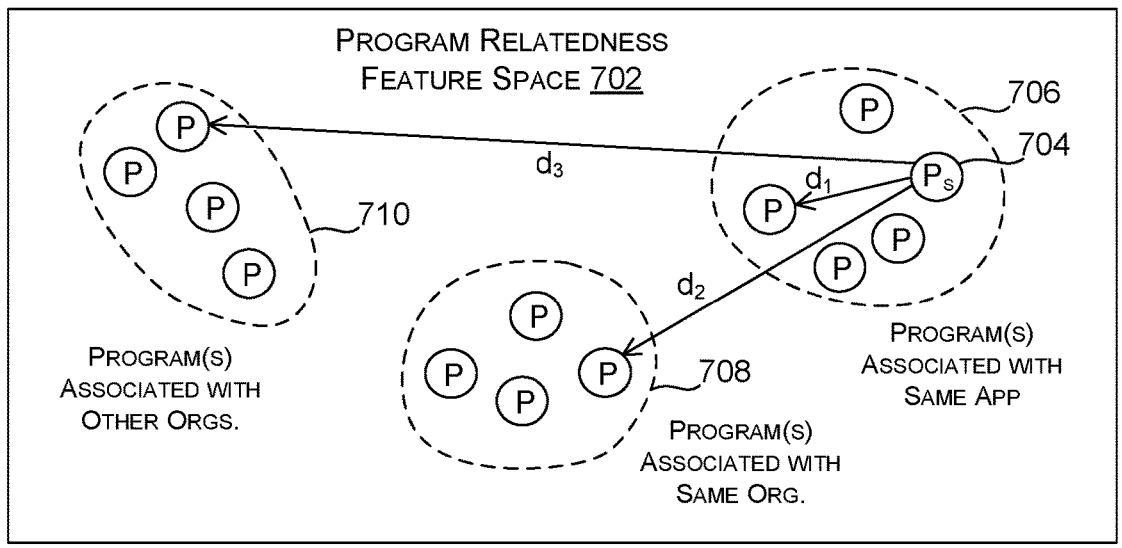
FIG. 7 shows relationships among programs.

FIG. 7 shows the above-described concept of related groupings of programs in a feature space 702, e.g., corresponding to a low-dimensioned vector space produced by a neural network. Assume that the collective features of a new program 112 under consideration map to a reference vector 704 (Ps) in the feature space 702. The feature space 702 also shows three clusters (706, 708, 710) of vectors representative of three respective groups of related programs. Any automated clustering algorithm can identify these clusters, such as the k-means algorithm. The first cluster 706 is closest to the reference vector 704, and therefore corresponds to a group of related programs that is likely to provide the best evidence regarding the behavior of the new program 112. The second cluster 708 is next-closest to the reference vector 704, and therefore represents the next-best evidence regarding the runtime behavior of the new program 112. The third cluster 710 is farthest from the reference vector 704, and therefore represents the least useful evidence regarding the runtime behavior of the new program 112. The distance in feature space 702 can be formally defined using any metric, such as cosine similarity.

A first implementation of the PRA component 506 uses one or more rules in a data store (not shown) to make an assessment whether a candidate program under consideration is related to the new program 112 or not. These rules formally express the tiers described above. That is, a first rule indicates that the candidate program is to be considered first-tier-related to the new program 112 if information exists (e.g., in the form of metadata associated with the candidate program) that the candidate program represents an earlier version of the new program 112. A second rule indicates that the candidate program is to be considered second-tier-related to the new program 112 if information exists that the candidate program is part of an overarching application provided by an entity. A third rule indicates that the candidate program is to be considered third-tier-related to the new program 112 if information exists that the candidate program originated from the same developer or organization that produced the new program 112, and that the candidate program is in the same class as the new program 112. A fourth rule indicates that the candidate program is to be considered fourth-tier-related to the new program 112 if information exists to indicate that the candidate program originated from the same developer or organization that produced the new program 112, but that the candidate program is not in the same class as the new program 112. A fifth rule indicates that the candidate program is to be considered fifth-tier-related to the new program 112 if information exists that the candidate program did not originate from the same developer or organization that produced the new program 112, but that the candidate program is in the same class as the new program 112. These rules are merely illustrative; another environment can use a different set of environment-specific rules to determine whether a candidate program under consideration is related to the new program 112.

Figure 8:
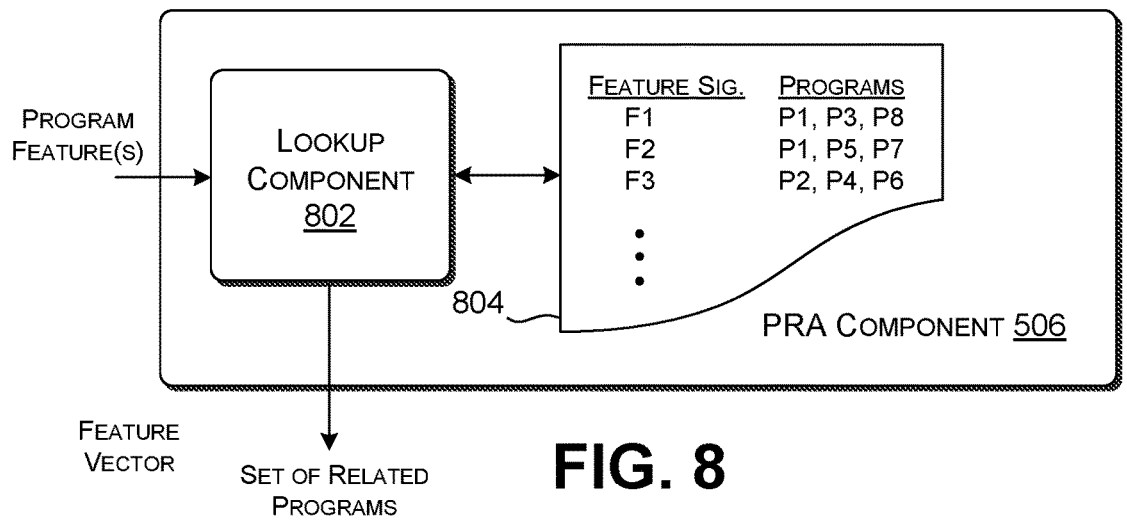
FIG. 8 shows one implementation of a program-relatedness-assessing (PRA) component, which is an element of the data-harvesting component of FIG. 5.

FIG. 8 shows another implementation of a program-relatedness-assessing (PRA) component 506. The PRA component 506 includes a lookup component 802 that receives a feature signature that represents a combination of features (e.g., characteristics) associated with the new program 112. The lookup component 802 finds an entry (if any) in a lookup table 804 that matches the feature signature (e.g., which has the same features, or a prescribed number of the same features, etc.). The entry also specifies a set of one or more related programs. These are programs that have been determined, in advance, to be related to any new program having the identified feature signature.

Figure 9:
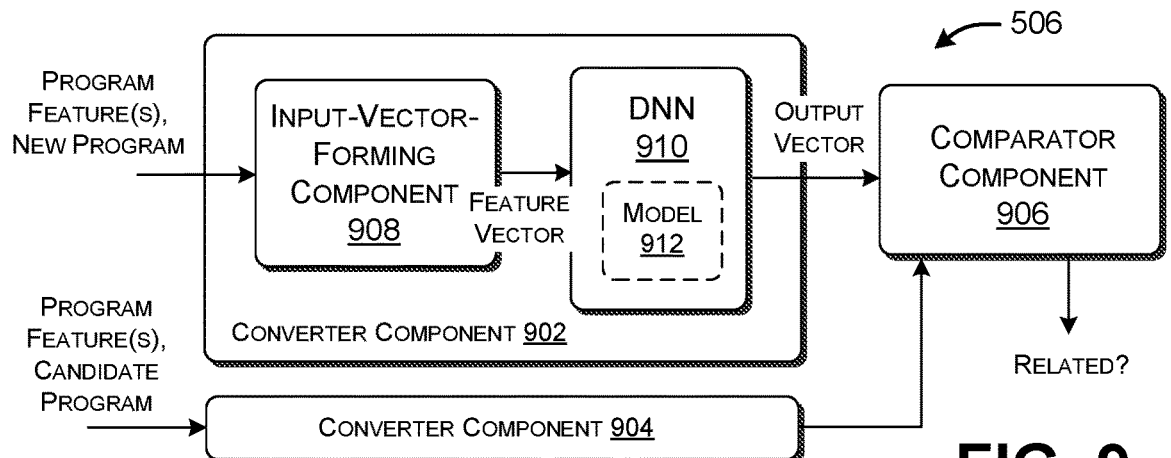
FIG. 9 shows another implementation of the PRA component.

FIG. 9 shows another implementation of the PRA component 506. A first converter component 902 maps a set of input features associated with the new program 112 into a first semantic vector in a semantic vector space. A second converter component 904 maps a set of input features associated with a candidate program (to which the new program 112 is being compared) to a second semantic vector in the same semantic vector space. A comparator component 906 can then determine the distance between the first semantic vector and the second semantic vector (e.g., using cosine similarity), and then optionally generate a conclusion of whether the new program 112 and the candidate program are related or not. In one case, the comparator component 906 makes this determination by comparing the distance to an environment-specific threshold value; if the distance is below that threshold value, the new program 112 is considered related to the candidate program.

The first converter component 902 can use an input-vector-forming component 908 to first convert the set of input features regarding the new program 112 into an input feature vector. In one implementation, the input feature vector has plural dimensions associated with plural respective features in the feature set. The input-vector-forming component 908 generates the input feature vector by setting appropriate values in appropriate dimensions of the input feature vector, to reflect the set of features. A deep neural network (DNN) 910 can then use a machine-trained model 912 to convert the input feature vector into an output semantic vector. The DNN 910 can use any type of neural network to perform this task, such as a fully-connected (FC) neural network, a convolutional neural network (CNN), etc. Although not shown, the second converter component 904 performs the same operations as the first converter component 902 with respect to a set of input features associated with the candidate program. A training system (not shown) trains the model 912 based on a set of training examples. Each training example provides a pair of programs and a label that indicates whether these two programs are considered related or not.

Still other implementations of the PRA component 506 are possible; the above three implementations are presented in the spirit of illustration, not limitation.

A.3. Program-Needs-Assessing Component

As said, the program-needs-assessing (PNA) component 128 receives a plurality of input factors associated with the new program 112 under consideration, as supplied by the data-harvesting component 114. It then maps these input factors into an indication of how much resources the new program 112 is expected to consume when executed in the data center 106. As described, at least some of the input factors pertain to the new program 112 itself. Other input factors pertain to programs that are not the same as the new program 112 but are considered related to the new program 112. In the explanation below, the term "evidence-bearing program" refers to any program in a universe of relevant programs that is taken into account in estimating the likely resource consumption of the new program 112. In some instances, an evidence-bearing program is the new program 112 itself. In other instances, the evidence-bearing program is a related program that has a specified degree of relatedness to the new program 112, not the new program 112 itself.

As set forth above, in some cases, the PNA component 128 specifically generates an upper-bound or worst-case estimate regarding how much resources the new program 112 will consume. Hence, any mention of an "estimate" or an "expected amount" herein is to be understood as at least encompassing this upper-bound/worst-case scenario.

Figures 10, 11:
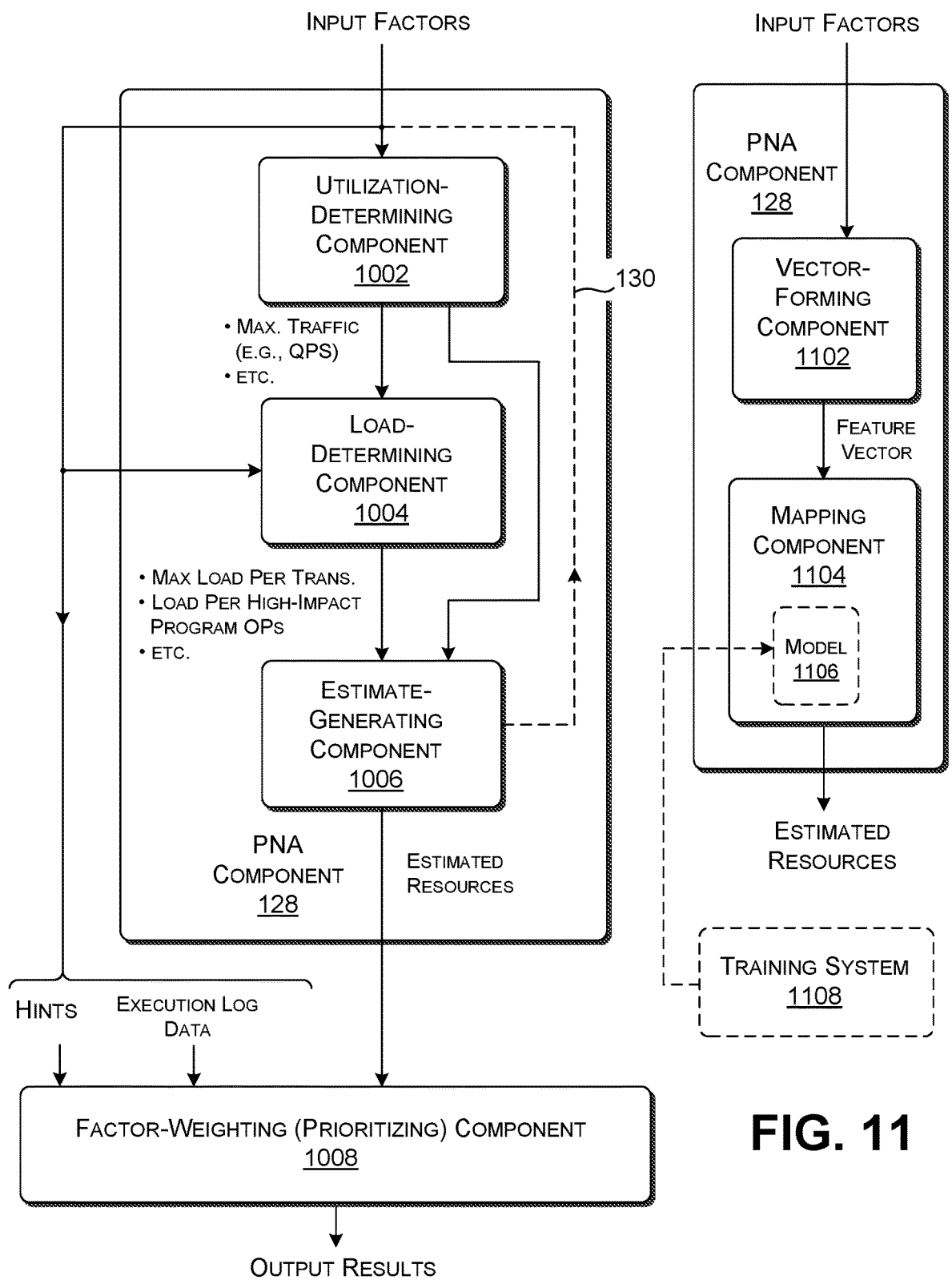
FIG. 10 shows an illustrative implementation of a program-needs-assessing (PNA) component which his another element of the CSM system of FIG. 1.
FIG. 11 shows another illustrative implementation of the PNA component.

FIG. 10 shows a first implementation of the PNA component 128. This version of the PNA component 128 generates an estimate of the amount of resources in a pipeline of stages, each stage mapping input information to an output result, and passing that output result to a next stage (if any) in a pipeline of stages. The stages use, respectively, a utilization-determining component 1002, a load-determining component 1004, and an estimate-generating component 1006. Each stage can weight an information item based on the relevance of the evidence-bearing program from it was obtained, e.g., corresponding to the tier of relevance (described above) to which the evidence-bearing program pertains. Information that directly describes the behavior of the new program 112 will be weighted the highest, while behavior of a related program provided by an "external" organization (other than the organization that produces the new program 112) is weighted the lowest. A high weight promotes a piece of evidence by a greater amount than a lower weight.

The utilization-determining component 1002 mines the input factors to identify the level of traffic experienced by one or more evidence-bearing programs. For example, the utilization-determining component 1002 can collect input information that describes the maximum traffic experienced by each evidence-bearing program within a specified span of time, such as the maximum queries-per-second experienced by a search engine in the last three years. The utilization-determining component 1002 can then form a weighted average of the maximum-traffic values associated with different evidence-bearing programs, to generate a utilization-based measure that gives an upper-bound estimate of the maximum utilization that may be experienced by the new program 112 after its launch (or in the course of its continued operation, if it has recently already been launched). Alternatively, or in addition, the utilization-determining component 1002 can select a maximum traffic value among a set of maximum traffic values associated with respective evidence-bearing programs, thus selecting the highest traffic value recorded in a universe of evidence-bearing programs.

Assume that the above-described utilization-based measure approximates the behavior of the evidence-bearing programs over an extended prior of time, extending into a phase in which the evidence-bearing programs reach a phase of steady-state operation. In addition, or alternatively, the utilization-determining component 1002 can generate one or more utilization-based measures that specifically focus on a span of time in which each evidence-bearing program was initially launched, e.g., corresponding to the first hour, day, week, etc. of its operation. In addition, or alternatively, the utilization-determining component 1002 can generate other utilization-based measures that express the average traffic experienced by the evidence-bearing programs over a span of time, not limited to those time at which these programs experienced maximum traffic.

The load-determining component 1004 mines the input factors to identify the load experienced by one or more evidence-bearing programs in performing an individual transaction, such as processing a single query. It then generates one or more load-based measures based on these input factors. For example, the load-determining component 1004 can assemble information that describes a maximum load experienced by each evidence-bearing program in processing a query. It does this for each resource in a specified set of resources (e.g., processor resources, memory resources, storage resources, network resources, etc.). For each dimension of resource, the load-determining component 1004 can then generate a weighted average of the maximum load. In addition, or alternatively, the load-determining component 1004 can select a maximum load value among a set of program-specific maximum load values.

The above kinds of load-based measures express a worst-case scenario of the amount of load that may be experienced by the new program 112 in processing a single transaction. A worst-case load-based measure will be particularly elevated (with reference to some environment-specific threshold value) when the evidence indicates that the new program 112 includes one or more operations that pose a high-risk of resource consumption, e.g., which involve interaction with external entities via a network connection, database retrieval operations, etc.

The load-determining component 1004 can generate other load-based measures that specifically focus on the load experienced by the evidence-bearing programs during their respective startup phases. In addition, or alternatively, the load-determining component 1004 can generate other load-based measures that take into account all load measurements collected over a span of time, not limited to those times at which the evidence-bearing programs experienced maximum loads.

FIG. 10 indicates that the utilization-determining component 1002 and the load-determining component 1004 operate in series. This is the case for those implementations in which the load-determining component 1004 performs at least some analysis that depends on the traffic estimates provided by the utilization-determining component. But these two components (1002, 1004) can alternatively, or in addition, operate in parallel.

The estimate-generating component 1006 can generate an estimate of the amount of resources that the new program 112 will consume in different ways based on one or more utilization-based measures provided by the utilization-determining component 1002 and one or more load-based measures provided by the load-determining component. In one case, the estimate-generating component 1006 generates a worst-case estimate by multiplying a utilization-based measure that describes the maximum-expected traffic of the new program 112 with a load-based measure that describes the maximum-expected load of each transaction. The estimate-generating component 1006 can also scale this estimate by the identified size of the new program 112.

The estimate-generating component 1006 can generate other estimates for different focuses of analysis. For example, the estimate-generating component 1006 can generate an estimate that focuses on the startup phases of the respective evidence-bearing programs. In addition, or alternatively, the estimate-generating component 1006 can generate other estimates that take into account all utilization and load measurements collected over a span of time, not just measurements for those times at which maximum load readings were obtained.

The estimate-generating component 1006 can also generate a confidence measure that reflects a level of confidence in its estimate, which can also be viewed as a margin of error. For instance, the estimate-generating component 1006 can generate a confidence level that depends on the number of pieces of evidence that it can find regarding the behavior of the new program 112, appropriately weighted based on the relevance of each piece of information (e.g., depending on the tier of relevance from which it originates). Confidence typically grows as the number of relevant observations increases. Alternatively, or in addition, the estimate-generating component 1006 can generate one or more statistical measures of confidence based on the evidence it collects, such as a mathematical variance measure.

The estimate-generating component 1006 can also scale its level of confidence based on other input factors, such as the amount of lines of new or modified code that the new program 112 introduces into an application. One rule posits that the level of uncertainty increases in proportion to the number of lines of code that are new or have changed. Another rule posits that the level of uncertainty increases when the new or modified code contains certain operations, for which the behavior is particularly hard to predict. More generally, the estimate-generating component 1006 can compute a confidence level using any environment-equation, algorithm, rule, model, etc., such as by using a weighted sum of different factors. The parameter values in such a weighted sum can be empirically chosen, and/or selecting using a machine-learning technique, etc.

After generating an estimate and an associated confidence measure, the estimate-generating component 1006 can compare its confidence measure with an environment-specific threshold value. If the confidence measure satisfies that value, the estimate-generating component 1006 outputs a final estimate. The estimate-generating component 1006 can also bias the estimate by the confidence level. For example, assume that the estimate for a particular resource is $z$, and the margin of error is $\pm\delta$; the estimate-generating component 1006 can generate a worst-case estimate of $z+\delta$. In addition, or alternatively, the estimate-generating component 1006 can offset the estimate by a default amount, such as by multiplying $z$ by 110%, etc.

If the confidence level does not satisfy the test, then the PNA component 128 can repeat the above-described analysis with additional evidence. For instance, the PNA component 129 can repeat its analysis with an expanded definition of what constitutes a related program. In a first iteration, for example, the PNA component 128 may exclude evidence that pertains to organizations other than the organization with which the new program 112 is associated. In a second iteration, the PNA component 128 can take these non-local organizations into account in producing evidence. FIG. 10 denotes the above-described iteration of analysis by a loop 130. But note that other implementations may omit iterative analysis; these other implementations inherently take into account the varying levels of relevance of the collected evidence by weighting that evidence in an appropriate manner, depending on the respective sources of the evidence.

In addition, or alternatively, the PNA component 128 can repeat its analysis for different programmatic scopes of analysis. Again recall the example of FIG. 6 in which the new program 112 is new in the sense that it includes a new portion 602 of code added to a preexisting version of the code. The PNA component 128 can perform separate analysis for the program 112 as a whole and the new portion 602.

In some cases, the PNA component 128 repeats its analysis one or more times, but still cannot generate an estimate that satisfies the prescribed level of confidence that is required. In this case, the PNA component 128 can choose an environment-specific default amount of resources that is suitably large (e.g., some default amount above the highest recorded level of resource consumption by an application in the data center 106). In other words, in this case, the PNA component 128 defaults to a strategy which potentially over-allocates resources to a running application. But even in this case, the resource-allocating component 134 can intelligently optimize the allocation of the physical resources 108 in the data center 106 to the running application.

As will be described below in Subsection A.4, the resource-allocating component 134 will take the estimate generated by the PNA component 128 into account when determining how to allocate resources in the data center 106. This, however, is just one piece of information that the resource-allocating component 134 may consider; the resource-allocating component 134 can also optionally take into account hint information 122 (that describes hints added by the developer of the new program 112) and same-program runtime information 124 (that describes the runtime behavior of the new program 112 in the data center 106, if in fact such evidence exists).

An optional factor-weighting component 1008 can apply weights to these three pieces of information depending on their relevance to the task of allocating resources. For instance, the factor-weighting component 1008 can apply a highest weight to the hint information 122, a next-highest weight to the same-program runtime information 124, and the third-highest weight to the estimate provided by the estimate-generating component 1006. A high weight confers more importance to a piece of evidence than a lower weight. The factor-weighting component 1008 can be implemented as a separate component from the PNA component 128 and/or as a part of the PNA component 128 itself.

The PNA component 128 of FIG. 10 can implement each of its sub-components in different ways. In one approach, the PNA component 128 can implement each sub-component using a set of discrete rules that express the illustrative logic described above. This is a heuristic approach. In another approach, the PNA component 128 can implement each sub-component using an automated solver or machine-trained model.

FIG. 11 shows another illustrative implementation of the PNA component 128. Here, a vector-forming component 1102 generates an input feature vector based on the input information that it receives from the data-harvesting component 114. The vector-forming component 1102 can perform this task in the same manner specified above for FIG. 9. In one case, the weights associated with the various pieces of input information constitute additional features incorporated into the input feature vector. A mapping component 1104 then maps the feature vector into an estimate of the amount of resources that are likely to be consumed by the new program 112. In one case, the mapping component 1104 performs this task using a machine-trained model 1106 provided by a training system 1108. For instance, the mapping component 1104 can generate the estimate based on a weighted sum of the various values in the input feature vector, wherein the different variables that appear in the weighted sum correspond to features, and the weights applied to the respective variables are learned by the training system 1108.

In another implementation of the single-stage strategy, a PNA component 128 can use handcrafted rules to generate the estimate based on a collection of input factors, without the use of a machine trained model. For instance, the PNA component 128 can generate the estimate using a weighted sum in the manner specified above, but where a systems engineer manually chooses the weighting values in that weighted sum.

Note that FIG. 11 serves to make the more general point that the PNA component 128 can collapse the staged analysis described with reference to FIG. 10 into a single mapping operation, or at least into fewer stages than shown in FIG. 10.

Still other implementations of the PNA component 128 are possible; the above two implementations (in FIGS. 10 and 11) are presented in the spirit of illustration, not limitation.

A.4. Resource-Allocating Component

Figure 12:
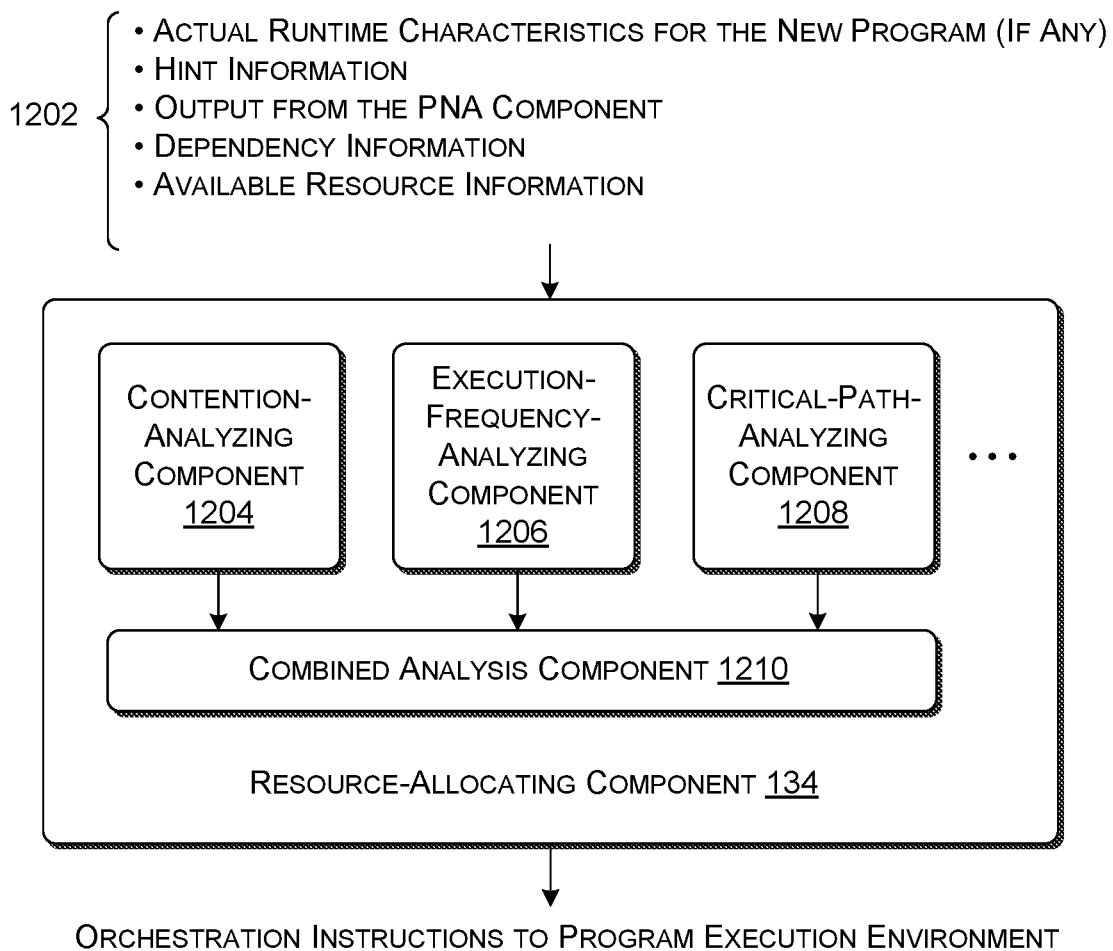
FIG. 12 shows an illustrative implementation of a resource-allocating component, which is another element of the CSM system of FIG. 1.

FIG. 12 shows one implementation of the resource-allocating component 134. The purpose of the resource-allocating component 134 is to allocate the physical resources 108 of the data center 106 to one or more processes in order to satisfy one or more objectives, such as minimizing resource consumption, maximizing performance (e.g., by minimizing latency), minimizing financial cost, and so on. As described above, a process refers to a runtime instantiation of at least part of a body of program code. A process may include one or more program modules, e.g., which correspond to runtime instantiations of DLLs or other software components associated with an overarching application. The resource-allocating component 134 makes its allocation decisions based on plural items of input information 1202, including, but not limited to: a) hint information 122 that describes a developer's predictions about how much resources the new program 112 will consume; b) same-program runtime information 124 that describes the runtime characteristics of the new program 112, presuming that the new program 112 has already been launched in the data center 106; and c) an estimate of the amount of resources that the new program 112 will consume, as provided by the PNA component 128. These three fields may be accompanied by appropriate weights specified by the factor-weighting component 1008 of FIG. 10.

The resource-allocating component 134 can also receive dependency information that describes the connections between program modules in the process(es), e.g., as supplied by the static analysis performed by the PFE component

504 of FIG. 5. The dependency information can also include runtime dependency information obtained from the data center's execution logs that describes how the program modules were linked together at runtime, which can vary from time to time, and transaction to transaction.

The resource-allocating component 134 can also receive available resource information 126. That information describes and quantifies the available resources in the data center 106, with any level of granularity. In some cases, the application(s) that run in the data center 106 are permitted to use a fraction of the physical resources that are provided, which leaves a prescribed amount of unused reserve capacity in the data center 106. If so, the available resource information 126 also specifies the amount of the resources that the application(s) are permitted to use (e.g., 80 percent of the total resources present in the data center 106, etc.).

The resource-allocating component 134 can choose from among different items of input information in different ways. In one approach, the resource-allocating component 134 can generate a weighted average of expected resource usage that combines different sources of resource usage, e.g., by weighting hint information 122 the highest, same-program runtime information 124 (describing the runtime behavior of the new program 112 itself) the next highest, and estimated resource usage (originating from the PNA component 128) the lowest. Alternatively, or in addition, the resource-allocating component 134 can exclusively use the hint information 122 alone and/or the same-program runtime information 124 alone, if this information is sufficiently strong (with reference to any environment-specific threshold value). Alternatively, the resource-allocating component 134 can use the estimated resource consumption from the PNA component 128 alone for those implementations in which the estimated resource consumption from this component already takes into account hint information 122 and same-program runtime information 124. In more general terms, different implementations of the CSM system 114 can take into account the hint information 122 and same-program runtime information 124 at different respective stages in its pipeline of processing operations.

Figure 14:
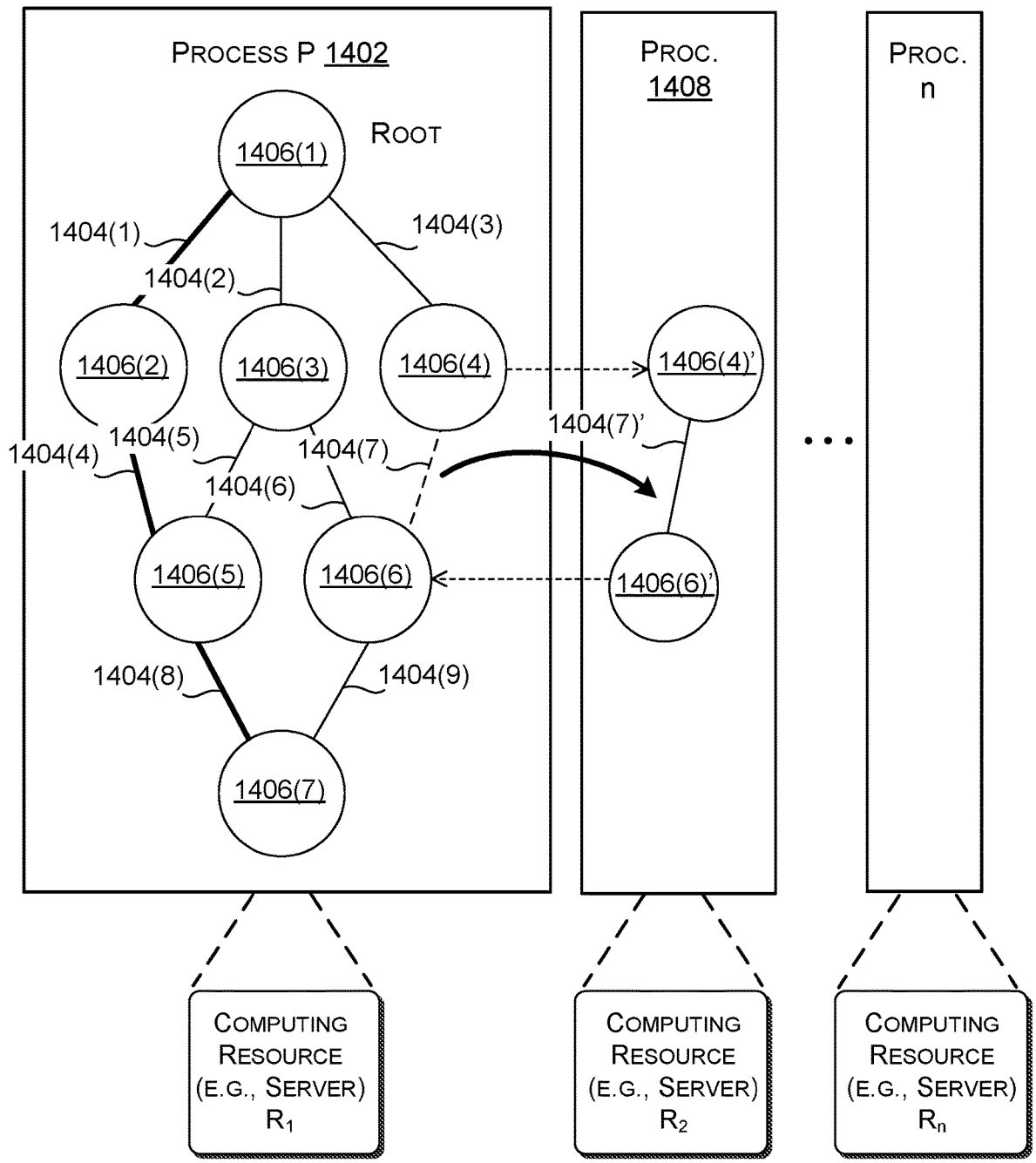
FIG. 14 shows plural processes being run in a data center. This figure is used herein to explain the operation of the resource-allocating component (of FIG. 12) and the scheduling component (of FIG. 13).

The operation of the resource-allocating component 134 will be described below in the illustrative context of an example of FIG. 14. With reference to that figure, at a given time, assume that a particular computing resource $R_1$ (e.g., a particular server or server cluster) implements a process P 1402 that represents the entirety of an application (although this is not a requirement). That figure illustrates the process P 1402 as a DAG. The DAG includes a plurality of program modules (1404(1), 1404(2), ..., 1404(9)) and data nodes (1406(1), 1406(2), ..., 1406(7)). Although not shown, the data center 106 may host plural instances of the same process P 1402 running on separate servers (e.g., servers $R_2$, $R_3$, etc.).

By assigning an entire process to a single server in the data center 106, the resource-allocating component 134 can minimize serialization and network costs, which are incurred in the transfer of information between separate processes (e.g., which may be hosted on different servers). More specifically, serialization cost refers to the amount of time that it takes the runtime management system 214 to package data for transfer between distinct processes in memory. Network costs refers to the amount of time that it takes the runtime management system 214 to transfer data over a communication conduit. In some cases, however, a single server $R_1$ may not be able to accommodate a process associated with an entire application. For example, the server $R_1$ may fall short with respect to any resource dimension(s), such as CPU resources, memory resources, available threads, network resources, etc. In that circumstance, the resource-allocating component 134 may determine that it is appropriate to transfer at least part of the process P 1402 running on the server $R_1$ to another process that runs on another server. In the specific non-limiting case of FIG. 14, the resource-allocating component 134 determines that it is appropriate to transfer a program module 1404(7) from the server $R_1$ to the server $R_2$. After that modification, the server $R_2$ runs the program module 1404(7) on the server $R_2$ in a process 1408; that program module 1404(7) is now labeled as program module 1404(7)' for clarity. The server $R_1$ and the server $R_2$ henceforth exchange data to integrate the program module 1404(7)' into the main flow operations that run on server $R_1$.

With specific regard to a cold start scenario, the resource-allocating component 134 attempts to assign one or more processes to the servers that run in the data center 106 to most effectively prepare for the launch of the new program 112 in the data center 106 (or the continued execution of that new program 112, for the case in which the new program 112 has already been launched). For instance, assume that the new program 112 contains a revision to the program module 1404(4) that runs in the process P 1402 on server R1. Further assume that the modified program module 1404(4) consumes more CPU capacity than it previously did, prior to modification. The resource-allocating component 134 may conclude that there is no longer sufficient CPU capacity to run the entire process P 1402 on the single server R1. The resource allocating component 134 will address this problem by identifying the most appropriate program module(s) to transfer from the process P 1402 to the process 1408 (that runs on server R2). Here, the resource allocating-component 134 determines that it is most appropriate to move the program module 1404(7) from the process P 1402 to the process 1408. In other cases, the resource-allocating component 134 can move plural program modules from the process P 1402 to two or more other processes. In another scenario, the new program 112 specifies the behavior of the entirety of a new application. Here, the resource-allocating component 134 may perform a more encompassing allocating operation, e.g., by creating one or more new processes to run the program modules.

The resource-allocating component 134 can incorporate three sub-components that perform different respective kinds of analyses, all directed to the goal of determining how processes are to be assigned to the physical resources 108 of the data center 106: a contention-analyzing component 1204; an execution-frequency-analyzing component 1206; and a critical-path-analyzing component 1208. The contention-analyzing component 1204 determines whether a current or prospective process will encounter contention among available resources. For example, the contention-analyzing component 1204 determines whether a set of program modules will exceed the available memory resources provided by a server. In some cases, the resource-allocating component 134 determines that it is appropriate to move a program module to another process if that program module consumes a relatively large amount of resources. In making any decision to move a program module, however, the resource-allocating component 134 will also consider the serialization and network costs associated with the movement of data to and from a program module running on another machine. If too high, this may suggest that it is more appropriate to address the insufficiency of resources on the server $R_1$ by moving another program module to a new process.

The execution-frequency-analyzing component 1206 identifies the frequency with which program modules are invoked in a process. In some cases, the resource-allocating component 134 determines that it is appropriate to move a program module to another process if it finds that this program module is less frequently invoked than other program modules in the process. This allocation strategy has merit because a program module that is infrequently invoked will incur lower overall serialization and network costs compared to a program module that is more frequently invoked.

A critical-path-analyzing component 1208 determines the critical path through a process at various times. That is, the critical path defines the chain of operations through a process that determines the overall latency of the process, meaning that it corresponds to the path through the process having the longest execution time. For example, at a particular time, FIG. 14 denotes the critical path through the process P 1402 as a bold-highlighted line. That path includes program modules 1404(1), 1404(4), and 1404(8). Note that the critical path may vary over time. Thus, the critical-path-analyzing component 1208 may identify the path through a process that most often corresponds to the critical path. In deciding what program module to move to another process, the resource-allocating component 134 can disfavor any program module that contributes to the critical path. This strategy has merit because breaking up a chain of processing modules that compose a critical path can lower the performance of the process; that is, it is appropriate in many cases to keep these modules together.

A combined analysis component 1210 can determine how to allocate resources in the data center 106 based on output results provided by the contention-analyzing component 1204, the execution-frequency-analyzing component 1206, and/or the critical-path-analyzing component 1208. The combined analysis component 1210 can perform this task using different approaches. In a heuristic approach, the combined analysis component 1210 can first attempt to assign the entirety of an application to a single process implemented by a single computing resource (e.g., a single server, a single cluster of servers, etc.). If this is not possible, then it identifies a group of candidate program modules that are expected to consume the most resources in the running application. From that group, the combined analysis component 1210 can choose a program module that is least frequently invoked, providing that this program module is not part of the critical path, and providing that movement of this program module to another process will not incur serialization and network costs above a prescribed environment-specific threshold value. This set of rules is merely illustrative; other implementations can use any other strategies in deciding how to allocate resources to an application. In yet other cases, the resource-allocating component can use an automated solver and/or a machine-trained model to determine how to assign a process to the physical resources of the data center 106.

In some cases, the resource-allocation component 134 may determine that there is no feasible allocation of resources 108 in the data center to meet the anticipated needs of the new program 112. In that case, the resource-allocation component 134 can begin taking resources from other processes, starting with those identified as least critical. It can also take resources from the data center's reserve capacity. Alternatively, or in addition, a systems engineer can address the shortcomings of the data center 106 by adding addition resources to the data center 106, e.g., by adding more servers.

A.5. Resource-Scheduling Component

Figure 13:
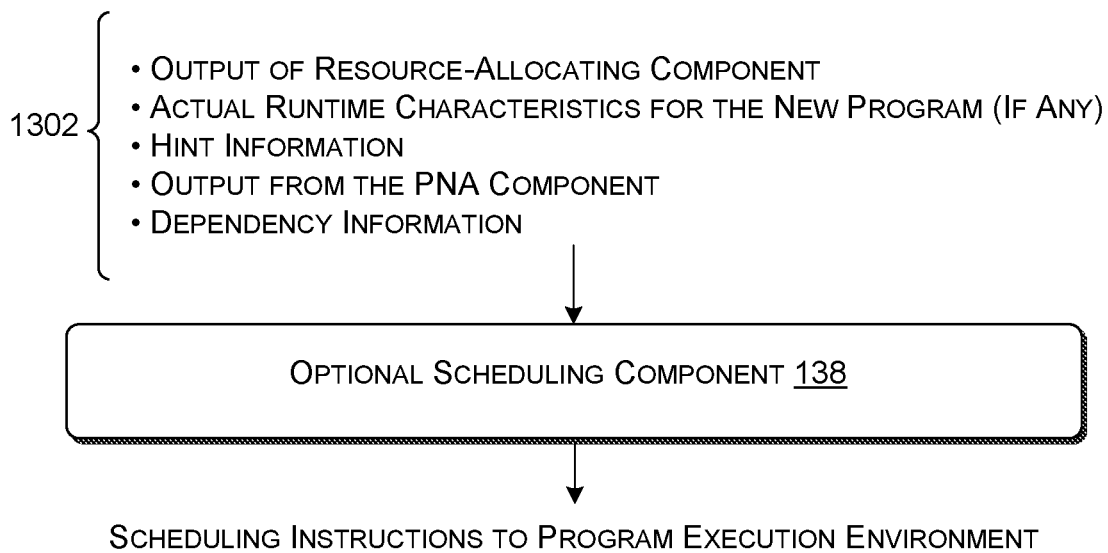
FIG. 13 shows an illustrative implementation of a scheduling component, which is another element of the CSM system of FIG. 1.

FIG. 13 shows an illustrative implementation of the resource-scheduling component 138. The resource-scheduling component 138 determines the order in which program modules will perform their respective operations within a process. The resource-scheduling component 138 performs its analysis by accepting the allocation decisions of the resource-allocating component 134 as a given. This means that the resource-scheduling component 138 can be considered as a downstream component relative to the resource-allocating component 134. As a further constraint, note that the resource-scheduling component 138 can only schedule the operation of a program module once its input data becomes available during execution of the new program 112.

The resource-scheduling component 138 receives plural items of input information 1302. That information includes, but is not limited to, any of: the output results of the resource-allocating component 134; the runtime information 124 that describes the runtime behavior of the new program 112; hint information 122; the estimate generated by the PNA component 128; dependency information, etc.

The resource-scheduling component 138 can apply different considerations in deciding how to order the operations that are performed in a process. As one consideration, the resource-scheduling component 138 can take into account the position of a program module within a process flow, with reference to a root node of the DAG (located at the "top" of the DAG). That is, the resource-scheduling component 138 decreases the priority assigned to a processing module in proportion to its distance from the root node. For instance, in FIG. 14, a process module 1404(1) occurs closer to the root of the DAG than a process module 1404(8). Based on this consideration, the resource-scheduling component 138 may schedule the process module 1404(1) to run prior to the process module 1404(8). As another factor, the resource-scheduling component 138 may give priority to program modules that take part in the critical path, compared to those that do not.

The resource-scheduling component 138 can apply any environment-specific set of rules to perform scheduling. In one non-limiting example, the resource-scheduling component 138 can prioritize scheduling of program modules first by layer (that is, proximity to the root of the DAG), and then by likelihood of appearing in the critical path. In another implementation, the resource-scheduling component 138 can use an automated solver and/or machine-trained network to determine the order in which to run the program modules.

More generally, the above-described implementations of the resource-allocating component 134 and the resource-scheduling component 138 are set forth here in the spirit of illustration, not limitation. Other implementations can adopt other allocation and scheduling strategies. Further note that the resource-scheduling component 138 and the resource-scheduling component 138 can incorporate at least some logic described in commonly-assigned U.S. patent application Ser. No. 16/540,896 (the '896 Application) to Robert Goodwin, et al., filed on Aug. 14, 2019, and bearing the title, "ORCHESTRATION AND SCHEDULING OF SERVICES." The '896 Application is incorporated by reference herein in its entirety by reference.

Note that the CSM system 104 has been described above as a set of cooperating elements, including the data-harvesting component 114, the PNA component 128, the resource-allocating component 134, etc. In one implementation, these components indeed correspond to distinct modules of logic as depicted in FIG. 1. In other implementations, the functions associated with two or more of these modules can be combined together, to form any number of composite components. For example, a single composite component can handle the functions of the PRA component 506 of FIG. 5 and the PNA component 128 of FIGS. 10 and 11. Any such composite component can perform its combined functions using any strategy or combination of strategies summarized in FIG. 4.

B. Illustrative Processes

Figure 17:
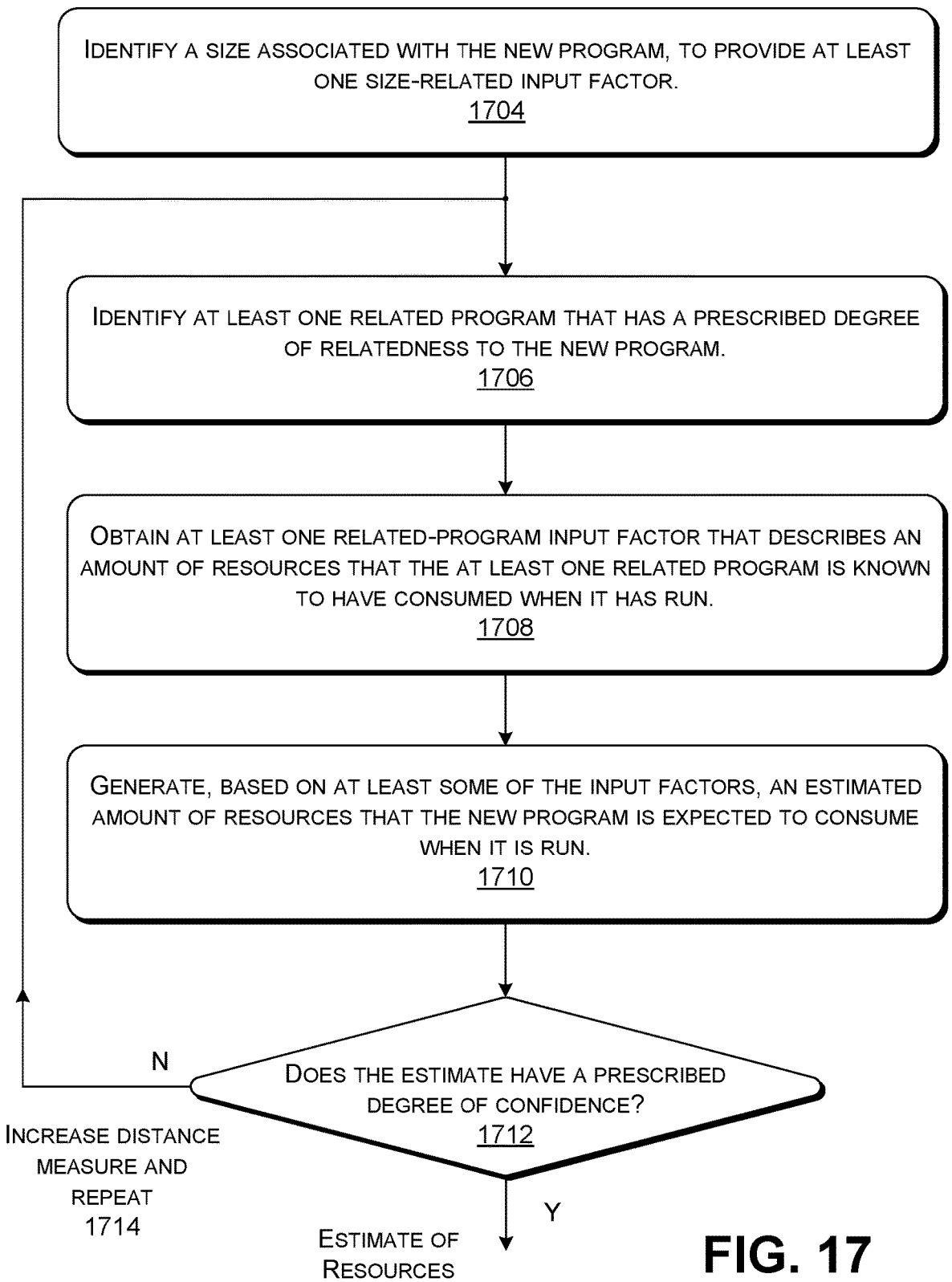
FIG. 17 is a flowchart that shows one illustrative manner in which the CSM system can incorporate evidence in an iterative manner.
Figure 18:
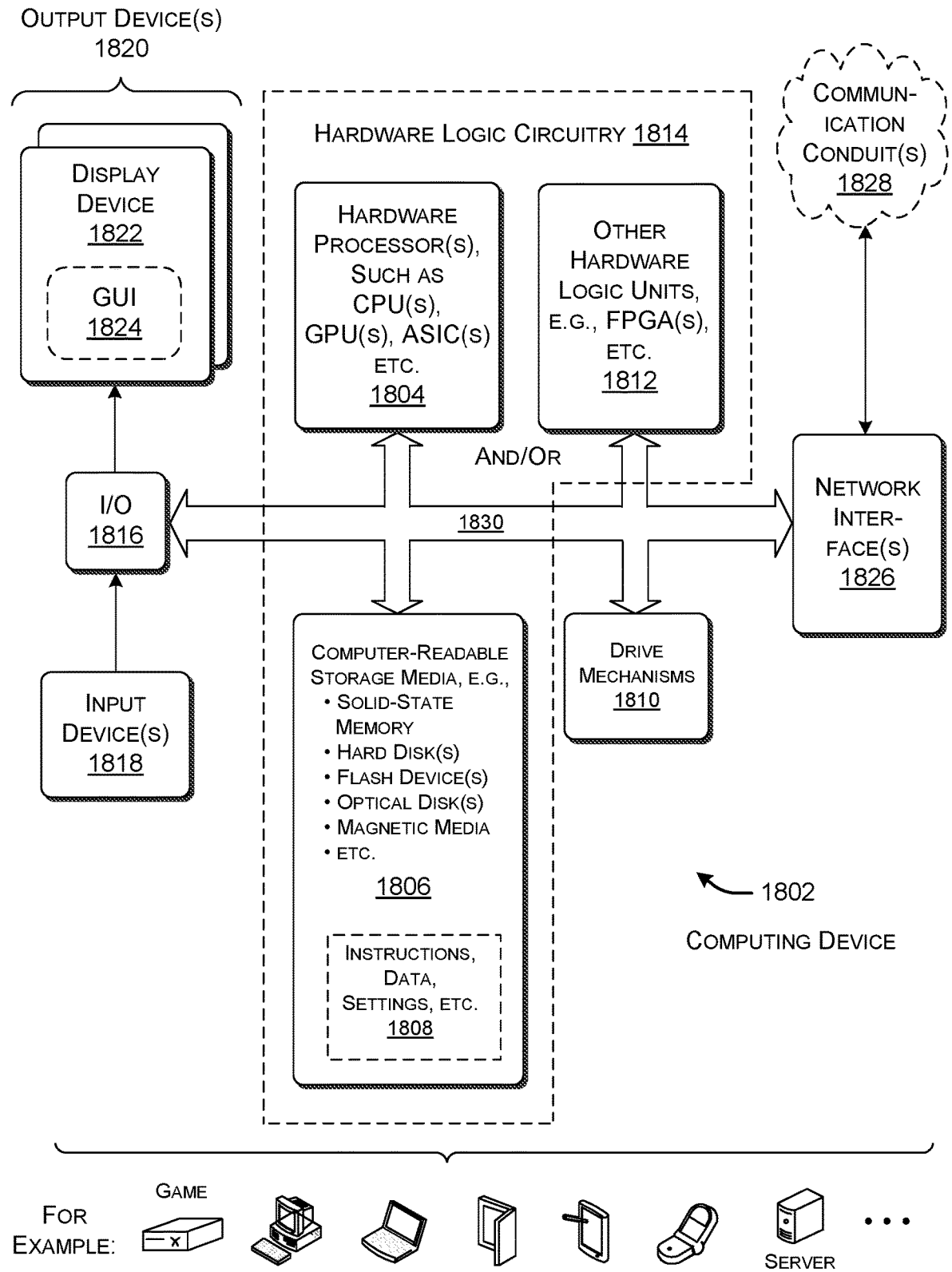
FIG. 18 shows an illustrative type of computing device that can be used to implement any aspect of the features shown in the foregoing drawings.

FIGS. 16-18 show processes that explain the operation of the cold-start-managing (CSM) system 104 of Section A in flowchart form. Since the principles underlying the operation of the CSM system 104 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

To begin with, FIG. 15 shows a process 1502, performed by one or more computing devices, for deploying resources in a data center 106. In block 1504, the CSM system 104 receives a new program 112 at a data center 106. Assume that there is insufficient information describing the runtime characteristics of the new program 112, with respect to a prescribed standard of sufficiency. In block 1506, the CSM system 104 collects plural input factors that provide evidence of an expected runtime behavior of the new program 112 when the new program 112 runs in the data center 106. The input factors include evidence regarding the runtime characteristics of one or more related programs. In block 1508, the CSM system 104 generates, based on at least some of the plural input factors, an estimated amount of resources that the new program 112 is expected to consume when the new program 112 is run in the data center 106. In block 1510, the CSM system 104 optionally weights the estimated amount of resources, relative to other more direct evidence regarding the runtime characteristics of the new program 112. In block 1512, the CSM system 104 determines a configuration of resources in the data center 106 that will provide the estimated amount of resources. It then deploys that configuration of resources in the data center 106. The new program 112 subsequently runs in the data center 106 using the configuration of resources that has been deployed.

FIG. 16 shows a process 1602 that represents additional illustrative details of block 1506 of FIG. 15. In block 1604, the CSM system 104 obtains at least one first input factor that describes the runtime characteristics of the new program 112, in response to running the new program 112 in the data center 106. In block 1606, the CSM system 104 obtains at least one second input factor that describes a predicted amount of resources that is expected to be consumed by the new program 112, as assessed by a provider of the new program 112, and as expressed in a hint. In block 1608, the CSM system 104 identifies at least one related program that has different logic than the new program 112, but which has at least one characteristic that is shared by the new program 112, based on a prescribed standard of relatedness. In block 1610, the CSM system 104 obtains at least one third input factor that describes an amount of resources that the at least one related program is known to have consumed when the related program has run.

FIG. 17 shows a process 1702 that provides illustrative details regarding one manner in which the CSM system 104 can iteratively generate an estimate. In block 1704, the CSM system 104 optionally identifies a size associated with the new program 112, to provide at least one size-related input factor. In block 1706, the CSM system 104 identifies at least one related program that has a prescribed degree of relatedness to the new program 112. In block 1708, the CSM system 104 obtains at least one related-program input factor that describes an amount of resources that the at least one related program is known to have consumed when it has run. In block 1710, the CSM system 104 generates, based on at least some of the plural input factors, an estimated amount of resources that the new program 112 is expected to consume when it is run in the data center 106. In block 1712, the CSM system 104 determines whether the estimate has a prescribed degree of confidence. If no, per operation 1714, the CSM system 104 repeats the above analysis with an expanded degree of program relatedness. This expansion will encompass a broader universe of programs related to the new program 112, compared to the previous iteration. If block 1712 is answered in the affirmative, then the process 1702 terminates.

C. Representative Computing Functionality

FIG. 18 shows a computing device 1802 that can be used to implement any aspect of the mechanisms set forth in the above-described figures. For instance, with reference to FIG. 2, the type of computing device 1802 shown in FIG. 18 can be used to implement any server in the data center 106, any user computing device, any server associated with the CSM system 104, etc. The type of computing device 1802 shown in FIG. 18 can also be used to implement any training system that generates a machine-trained model. In all cases, the computing device 1802 represents a physical and tangible processing mechanism.

The computing device 1802 can include one or more hardware processors 1804. The hardware processor(s) 1804 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1802 can also include computer-readable storage media 1806, corresponding to one or more computer-readable media hardware units. The computer-readable storage media 1806 retains any kind of information 1808, such as machine-readable instructions, settings, data, etc. Without limitation, for instance, the computer-readable storage media 1806 may include one or more solid-state devices, one or more magnetic hard disks, one or more optical disks, and so on. Any instance of the computer-readable storage media 1806 can use any technology for storing and retrieving information. Further, any instance of the computer-readable storage media 1806 may represent a fixed or removable unit of the computing device 1802. Further, any instance of the computer-readable storage media 1806 may provide volatile or non-volatile retention of information.

The computing device 1802 can utilize any instance of the computer-readable storage media 1806 in different ways. For example, any instance of the computer-readable storage media 1806 may represent a hardware memory unit (such as Random Access Memory (RAM)) for storing transient information during execution of a program by the computing device 1802, and/or a hardware storage unit (such as a hard disk) for retaining/archiving information on a more permanent basis. In the latter case, the computing device 1802 also includes one or more drive mechanisms 1810 (such as a hard drive mechanism) for storing and retrieving information from an instance of the computer-readable storage media 1806.

The computing device 1802 may perform any of the functions described above when the hardware processor(s) 1804 carry out computer-readable instructions stored in any instance of the computer-readable storage media 1806. For instance, the computing device 1802 may carry out computer-readable instructions to perform each block of the processes described in Section B.

Alternatively, or in addition, the computing device 1802 may rely on one or more other hardware logic units 1812 to perform operations using a task-specific collection of logic gates. For instance, the hardware logic unit(s) 1812 may include a fixed configuration of hardware logic gates, e.g., that are created and set at the time of manufacture, and thereafter unalterable. Alternatively, or in addition, the other hardware logic unit(s) 1812 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 18 generally indicates that hardware logic circuitry 1814 includes, but it not limited to, any combination of the hardware processor(s) 1804, the computer-readable storage media 1806, and/or the other hardware logic unit(s) 1812. That is, the computing device 1802 can employ any combination of the hardware processor(s) 1804 that execute machine-readable instructions provided in the computer-readable storage media 1806, and/or one or more other hardware logic unit(s) 1812 that perform operations using a fixed and/or programmable collection of hardware logic gates. More generally stated, the hardware logic circuitry 1814 corresponds to one or more hardware-implemented logic units of any type(s) that perform operations based on logic stored in and/or otherwise embodied in the hardware logic unit(s).

In some cases (e.g., in the case in which the computing device 1802 represents a user computing device), the computing device 1802 also includes an input/output interface 1816 for receiving various inputs (via input devices 1818), and for providing various outputs (via output devices 1820). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1822 and an associated graphical user interface presentation (GUI) 1824. The display device 1822 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1802 can also include one or more network interfaces 1826 for exchanging data with other devices via one or more communication conduits 1828. One or more communication buses 1830 communicatively couple the above-described units together.

The communication conduit(s) 1828 can be implemented in any manner, e.g., by a local area computer network, a wide area computer network (e.g., the Internet), point-to-point connections, etc., or any combination thereof. The communication conduit(s) 1828 can include any combination of hardwired links, wireless links, routers, gateway functionality, name servers, etc., governed by any protocol or combination of protocols.

FIG. 18 shows the computing device 1802 as being composed of a discrete collection of separate units. In some cases, the collection of units may correspond to discrete hardware units provided in a computing device chassis having any form factor. In other cases, the computing device 1802 can include a hardware logic unit that integrates the functions of two or more of the units shown in FIG. 1. For instance, the computing device 1802 can include a system-on-a-chip (SoC or SOC), corresponding to an integrated circuit that combines the functions of two or more of the units shown in FIG. 18.

The following summary provides a non-exhaustive set of illustrative aspects of the technology set forth herein.

According to a first aspect, a method, performed by one or more computing devices, is described for allocating resources. The method includes: receiving a new program at a data center, there being insufficient information describing runtime characteristics of the new program, with respect to a prescribed standard of sufficiency; and collecting plural input factors that provide evidence of an expected runtime behavior of the new program when the new program runs in the data center. The collecting operation, in turn, includes: identifying a size associated with the new program, to provide at least one size-related input factor; identifying at least one related program that has different logic than the new program, but has a specified degree of relatedness to the new program; and obtaining at least one related-program input factor that describes an amount of resources that the at least one related program is known to have consumed when the at least one related program has run. The method further includes generating, based on at least some of the plural input factors, an estimated amount of resources that the new program is expected to consume when the new program is run in the data center. In an orchestrating operation, the method then includes determining a configuration of resources in the data center that will provide the estimated amount of resources, and deploying that configuration of resources in the data center. The new program subsequently runs in the data center using the configuration of resources that has been deployed.

According to a second aspect, the new program has no preexisting counterpart that has run in the data center.

According to a third aspect, the new program represents a modification to an earlier version of the new program which has run in the data center.

According to a fourth aspect, one or more of the at least one related-program input factors describes an amount of transactions that the at least one related program has performed within a prescribed timeframe.

According to a fifth aspect, one or more of the at least one related-program input factor describes a load imposed by the at least one related program in processing an individual transaction.

According to a sixth aspect, relating to the fifth aspect, the method further includes analyzing the new program to identify at least one operation that is expected to impose an elevated load, relative to a prescribed reference. One or more of the at least one related-program input factor describes the elevated load.

According to a seventh aspect, relating to the sixth aspect, the at least one operation that is expected to impose an elevated load includes an operation that involves interaction with a resource via a communication network.

According to an eighth aspect, relating to the sixth aspect, the at least one operation that is expected to impose an elevated load includes an operation that involves interaction with a database.

According to a ninth aspect, the prescribed standard of relatedness is expressed using a distance measure that describes a degree of similarity between the new program and a related program.

According to a tenth aspect, the identifying at least one related program includes: mapping a set of characteristics associated with the new program to a first vector in a vector space; mapping a set of characteristics associated with a particular related program to a second vector in the vector space; and determining a distance between the first vector and the second vector in the vector space, the distance reflecting a degree of similarity between the new program and the particular related program.

According to an eleventh aspect, the operation of obtaining includes obtaining related-program input factors regarding related programs having different tiers of relevance to the new program. The tiers include: a first tier corresponding to one or more related programs that correspond to one or more respective earlier versions of the new program; a second tier corresponding to one or more related programs that are associated with a same organization as the new program; and a third tier corresponding to one or more related programs that are associated with one or more different organizations than an organization with which the new program is associated.

According to a twelfth aspect, relating to the eleventh aspect, the method further includes weighting input factors by amounts depending on the respective tiers to which they pertain.

According to a thirteenth aspect, the operation of generating operates in two or more stages, each stage other than a first stage defining what constitutes a related program in a more expansive manner compared to a previous stage.

According to a fourteenth aspect, relating to the thirteenth aspect, the operation of generating advances to a next stage based on a determination that a previous stage fails to provide sufficient information to generate the estimated amount of resources with a prescribed degree of confidence.

According to a fifteenth aspect, one or more computing devices are described for estimating resources. The computing device(s) include hardware logic circuitry, the hardware logic circuitry, in turn, including: (a) one or more hardware processors that perform operations by executing machine-readable instructions stored in a memory, and/or (b) one or more other hardware logic units that perform the operations using a task-specific collection of logic gates. The operations include: receiving a new program at a data center, there being insufficient information describing runtime characteristics of the new program, with respect to a prescribed standard of sufficiency; and collecting plural input factors that provide evidence of an expected runtime behavior of the new program when the new program runs in the data center. The collecting operation, in turn, includes: identifying a first related program and a second related program, each related program having different logic than the new program, but having a specified degree of relatedness to the new program; and obtaining at least one first related-program input factor that describes an amount of resources that the first related program is known to have consumed when the first related program has run, and obtaining at least one second related-program input factor that describes an amount of resources that the second related program is known to have consumed when the second related program has run. The first related program is more closely related to the new program compared to the second related program, based on a prescribed standard of relatedness. The operations further include: generating, based on at least some of the plural input factors, an estimated amount of resources that the new program is expected to consume when it is run in the data center; and, in an orchestrating operation, determining a configuration of resources in the data center that will provide the estimated amount of resources. The operation of generating uses the at least one second related-program input factor when it is determined that the estimated amount of resources cannot be calculated with a prescribed degree of confidence by using the at least one first related-program input factor without the at least one second related-program input factor.

According to a sixteenth aspect, relating to the fifteenth aspect, the first related program is associated with an earlier version of the new program, and the second related program is associated with a same organization as the new program, but does not correspond to an earlier version of the new program.

According to a seventeenth aspect, relating to the fifteenth aspect, wherein the identifying further includes identifying a third related program that is associated with one or more different organizations than an organization with which the new program is associated.

According to an eighteenth aspect, relating to the fifteenth aspect, the plural input factors include, for a particular related program: a size-related input factor that describes a size associated with the new program; a related-program input factor that describes an amount of transactions that the particular related program has performed within a prescribed timeframe; and a related-program input factor that describes a load imposed by the particular related program in processing an individual transaction.

According to a nineteenth aspect, a computer-readable storage medium for storing computer-readable instructions is described. The computer-readable instructions, when executed by one or more hardware processors, perform a method that includes: receiving a new program at a data center, there being insufficient information describing runtime characteristics of the new program, with respect to a prescribed standard of sufficiency; and collecting plural input factors that provide evidence of an expected runtime behavior of the new program when the new program runs in the data center. The collecting operation includes: obtaining at least one first input factor that describes the runtime characteristics of the new program, in response to running the new program in the data center; obtaining at least one second input factor that describes a predicted amount of resources that is expected to be consumed by the new program, as assessed by a provider of the new program, and as expressed in a hint; identifying at least one related program that has different logic than the new program, but has a specified degree of relatedness to the new program; and obtaining at least one third input factor that describes an amount of resources that the at least one related program is known to have consumed when the related program has run. The method further includes: generating, based on at least some of the plural input factors, an estimated amount of resources that the new program is expected to consume when it is run in the data center; and, in an orchestrating operation, determining a configuration of resources in the data center that will provide the estimated amount of resources. The orchestrating operation is based on a weighted combination of the estimated amount of resources, the least one first input factor, and the at least one second input factor. The weighted combination assigns the estimated amount of resources a lower relevance compared to the at least one first input factor and the at least one second input factor.

According to a twentieth aspect, relating to the nineteenth aspect, the at least one third input factor includes, for a particular related program: a related-program input factor that describes an amount of transactions that the particular related program has performed within a prescribed timeframe; and a related-program input factor that describes a load imposed by the particular related program in processing an individual transaction.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by one or more computing devices, for allocating resources, comprising:
receiving a new program at a data center;
collecting plural input factors that provide evidence of an expected runtime behavior of the new program when the new program runs in the data center, said collecting including:
identifying a size associated with the new program as reflected by a number of lines in the new program, to provide at least one size-related input factor;
identifying at least one related program that has different logic than the new program, but has a specified degree of relatedness to the new program; and
obtaining at least one related-program input factor that describes an amount of resources that said at least one related program is known to have consumed when said at least one related program has run;
generating, based on the plural input factors, an estimated amount of resources that the new program is expected to consume when the new program is run in the data center, together with a level of confidence associated with the estimated amount of resources,
wherein said generating operates in two or more stages, each stage other than a first stage using broader criteria to establish what constitutes a related program compared to a previous stage,
wherein said generating advances to a next stage based on a determination that the level of confidence of the estimated amount of resources of a previous stage fails to satisfy a prescribed threshold value; and
in an orchestrating operation, determining a configuration of resources in the data center that will provide the estimated amount of resources, and deploying that configuration of resources in the data center,
the new program subsequently running in the data center using the configuration of resources that has been deployed.

2. The method of claim 1, wherein the new program has no preexisting counterpart that has run in the data center.

3. The method of claim 1, wherein the new program represents a modification to an earlier version of the new program which has run in the data center.

4. The method of claim 1,
wherein the method further includes analyzing the new program to identify at least one operation that has been predetermined or predicted to demand an elevated amount of resources, relative to a prescribed baseline amount of resources, and
wherein one or more of said at least one related-program input factor describes the elevated amount of resources.

5. The method of claim 4, wherein said at least one operation that has been predetermined or predicted to demand an elevated amount of resources includes an operation that involves interaction with a resource via a communication network.

6. The method of claim 4, wherein said at least one operation that has been predetermined or predicted to demand an elevated amount of resources includes an operation that involves interaction with a database.

7. The method of claim 4, wherein a particular operation that has been predetermined or predicted to demand an elevated amount of resources is identified by comparing the particular operation to a list of predetermined operations that are known to demand an elevated amount of resources.

8. The method of claim 4, wherein a particular operation that is has been predetermined or predicted to demand an elevated amount of resources is identified by using a machine-trained classification model.

9. The method of claim 1, wherein said identifying identifies said at least one related program from a predetermined hierarchy of tiers, the tiers including:
a first tier corresponding to one or more related programs that correspond to one or more respective earlier versions of the new program;
a second tier corresponding to one or more related programs that are associated with a same organization as the new program; and
a third tier corresponding to one or more related programs that are associated with one or more different organizations than an organization with which the new program is associated.

10. The method of claim 9, wherein the method further includes weighting input factors by amounts depending on the respective tiers to which they pertain.

11. The method of claim 9, wherein the tiers in the hierarchy are expressed by one or more rules.

12. The method of claim 1, wherein said generating produces the level of confidence based on a weighted measure of evidence that is collected by said collecting.

13. The method of claim 1, wherein said generating produces the level of confidence based any one or more of:
an amount of the evidence that is collected by said collecting;
variance of the evidence that is collected;
an amount of code in the new program that is new; or
detected presence of one or more specified kinds of operations in the new program.

14. One or more computing devices for estimating resources, comprising:
hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates, the operations including:
receiving a new program at a data center;
collecting plural input factors that provide evidence of an expected runtime behavior of the new program when the new program runs in the data center, said collecting including:
identifying a first related program and a second related program, each related program having different logic than the new program, but having a specified degree of relatedness to the new program; and
obtaining at least one first related-program input factor that describes an amount of resources that the first related program is known to have consumed when the first related program has run, and obtaining at least one second related-program input factor that describes an amount of resources that the second related program is known to have consumed when the second related program has run,
the first related program being more closely related to the new program compared to the second related program, based on a prescribed standard of relatedness; and
generating, based on said at least one first related-program input factor, an estimated amount of resources that the new program is expected to consume when it is run in the data center, together with a level of confidence associated with the estimated amount of resources;
upon determining that the level of confidence does not satisfy a prescribed threshold value, generating, based on said at least one second related-program input factor, another estimated amount of resources that the new program is expected to consume when it is run in the data center, together with an updated level of confidence associated with said another estimated amount of resources; and
in an orchestrating operation, determining a configuration of resources in the data center that will provide said another estimated amount of resources.

15. The one or more computing devices of claim 14, wherein the first related program is a program that has been identified by said identifying that is associated with an earlier version of the new program, and wherein the second related program is another program that has been identified by said identifying that is associated with a same organization as the new program, but does not correspond to an earlier version of the new program, a version and an organization of a given program being identified based on data associated with the given program.

16. The one or more computing devices of claim 14, wherein said identifying includes identifying a third related program that is associated with one or more different organizations than an organization with which the new program is associated, an organization of a given program being identified based on data associated with the given program.

17. The one or more computing devices of claim 14, wherein the plural input factors include, for a particular related program:
a size-related input factor that describes a size associated with the new program as reflected by a number of lines in the new program;
a related-program input factor that describes an amount of transactions that the particular related program has performed within a prescribed timeframe; and
another related-program input factor that describes a load imposed by the particular related program in processing an individual transaction.

18. A computer-readable storage medium for storing computer-readable instructions, the computer-readable instructions, when executed by one or more hardware processors, performing a method that comprises:
receiving a new program at a data center;
collecting plural input factors that provide evidence of an expected runtime behavior of the new program when the new program runs in the data center, said collecting including:
obtaining at least one first input factor that describes the runtime characteristics of the new program, in response to running the new program in the data center;
obtaining at least one second input factor that describes a predicted amount of resources that is expected to be consumed by the new program, as assessed by a provider of the new program, and as expressed in a hint;
identifying at least one related program that has different logic than the new program, but has a specified degree of relatedness to the new program; and
obtaining at least one third input factor that describes an amount of resources that said at least one related program is known to have consumed when the related program has run;
generating, based on one or more of the plural input factors, including the third input factor, an estimated amount of resources that the new program is expected to consume when it is run in the data center; and
in an orchestrating operation following said collecting and generating, producing a weighted combination based on first input information that provides the estimated amount of resources produced by said generating based on at least the third input factor, second input information that provides said least one first input factor, and third input information that provides said at least one second input factor, and determining a configuration of resources in the data center based on the weighted combination,
the weighted combination assigning the estimated amount of resources produced by said generating a lower relevance compared to said at least one first input factor and said at least one second input factor.

19. The computer-readable storage medium of claim 18, wherein said generating operates in two or more stages, each stage other than a first stage using a different criteria to establish what constitutes a related program compared to a previous stage,
    wherein said generating advances to a next stage based on a determination that a level of confidence of the estimated amount of resources of a previous stage fails to satisfies a prescribed threshold value.

20. The computer-readable storage medium of claim 18, wherein the weighted combination is a weighted average.

\* \* \* \* \*